United States Patent [19]
Cossock

[11] Patent Number: 5,487,166
[45] Date of Patent: Jan. 23, 1996

[54] COMPUTER WITH TWO-DIMENSIONAL MERGE TOURNAMENT SORT USING OFFSET-VALUE CODING

[75] Inventor: David Cossock, Berkeley, Calif.

[73] Assignee: Amdahl Corporation, Sunnyvale, Calif.

[21] Appl. No.: 308,751

[22] Filed: Sep. 19, 1994

[51] Int. Cl.$^6$ ............................................. G06F 7/24
[52] U.S. Cl. ................... 395/600; 364/DIG. 1; 364/222.81; 364/222.9
[58] Field of Search .................. 395/600, 444, 395/445, 464, 414

[56] References Cited

U.S. PATENT DOCUMENTS

| | | | |
|---|---|---|---|
| 5,210,870 | 5/1993 | Baum et al. | 395/600 |
| 5,287,494 | 2/1994 | Garcia et al. | 395/600 |
| 5,355,478 | 10/1994 | Brady et al. | 395/600 |

OTHER PUBLICATIONS

Donald E. Knuth, "The Art of Computer Programming: vol. 3/Sorting and Searching," 1973, pp. 209–218; 471–473.

*Primary Examiner*—Paul V. Kulik
*Attorney, Agent, or Firm*—Fliesler, Dubb, Meyer & Lovejoy

[57] ABSTRACT

To perform a sort of N records, a two-dimensional tree structure is formed with a tree of subtrees, where each subtree is formed by a plurality of nodes organized in a binary tree. For each leaf node in the tree, there is an ancestor chain of nodes (from child to parent, from parent to grand-parent, from grand-parent to great-grand-parent, ... and so on) that connects each leaf node to the root node. To perform the sort, the processing unit stores codes representing keys into nodes in the two-dimensional tree and performs a tree sort of the keys using the codes. The codes are accessed in the subtrees and processed to determine the sort order of the keys and therefore the sort order of the corresponding records.

4 Claims, 4 Drawing Sheets

FIG. 5

| Binary Node Level | No. Nodes | | Subtree Row |
|---|---|---|---|
| 1 | 1 | * | 1 |
| 2 | 2 | * * | |
| 3 | 4 | * * * * | |
| 4 | 8 | * * * * * * * * | |
| | | | |
| 5 | 16 | * * * * * * * * * * * * * * * * | 2 |
| 6 | 32 | | |
| 7 | 64 | | |
| 8 | 128 | | |
| | | | |
| 9 | 256 | | 3 |
| 10 | 512 | | |
| 11 | 1024 | | |
| 12 | 2048 | | |
| | | | |
| 13 | 4096 | | 4 |
| 14 | 8192 | | |
| 15 | 16,384 | | |
| 16 | 32,768 | | |
| | | | |
| 17 | 65,536 | | 5 |
| 18 | 131,072 | | |
| 19 | 262,144 | | |
| 20 | 524,288 | | |
| ............................................................ | | | |
| 21 | 1,048,576 | | |

COMPUTER WITH TWO-DIMENSIONAL MERGE TOURNAMENT SORT USING OFFSET-VALUE CODING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the field of sorting and computer methods and apparatus for sorting.

2. Description of the Related Art

Sorting is important to the computer field in many applications. For example, enterprises and other users often wish to sort list of employees, customers, fries, inventory, data or other categories of information. The sort order can be by any criteria including alphabetical and numerical in ascending or descending order for one or more "fields" within the records. Because sorting is important in the computer field many methods and apparatus for sorting have been devised. Computer sorting is described in many works including, *Sorting and Searching, The Art Of Computer Programming*, Vol. 3 by D. E. Knuth, and *Sorting and Sort Systems* by H. Lorin and in *Programs=Algorithms+Data Structures* by N. Wirth.

The efficiency with which sort algorithms perform in computers is, in part, a function of the architecture of computer systems. Computer systems generally have an architecture which includes processing units (central processing units-CPU's) and a storage system which includes internal storage and external storage. The internal storage may include cache, primary and secondary random access memory. The external storage includes I/O units such as magnetic or optical disc or magnetic tape drives.

Information to be sorted is organized into records. The task of sorting causes all the records to be sorted to be accessed in the storage system. The processing units as part of the sort processing fetch the records from the storage system and store the records back into the storage system with an ordering determined by the sort algorithm.

For purposes of sorting, sorting algorithms have been characterized as being internal or external. An internal sort is one in which the records to be sorted are resident within internal storage of the computer system. An external sort is one in which the records to be sorted are not fully resident within internal storage and hence are stored in external storage during the sort processing.

When the number of records to be sorted is small so that the records can all be contained concurrently in the internal storage, then generally an internal sort algorithm is preferred since it performs more quickly than an external sort algorithm since, in an internal sort, time need not be wasted in accessing records from the slower external storage.

When the records to be sorted cannot be contained entirely within the internal storage system, then sorting algorithms tend to be slowed down to account for the additional time required to access records from the slower external storage. Sorting a large number of data records with an external sort usually requires a two stage process. The first stage is the initial sorting of as many data records as can be accommodated by the faster internal storage to create strings of sorted records. The second stage involves merging the strings of sorted records, with accesses to the external storage, into a final sorted sequence of records.

For external sorts, sorting algorithms have been designed to accommodate different I/O computer architectures. For example, when a computer system is limited by the access time required for accesses to disk storage, sorting algorithms which minimize the number of external storage accesses enhance the efficiency of the sort algorithm.

For internal sorts, the literature has assumed a flat random access machine (RAM) model for internal storage in which all memory accesses to internal storage are of identical computational cost. With this assumption, the literature has concluded that algorithms such as quicksort, heapsort and tournament sort provide the greatest efficiency for internal sorts. The latter two algorithms are frequently employed as replacement selection techniques for the internal sorts of external sort strings. Tournament sorts are described in the standard textbooks such as Knuth, D. E. "Sorting and Searching", *The Art of Computer Programming*, Vol. 3 and Lorin, H. *Sorting and Sort Systems*.

Contrary to the assumption of the literature, however, the flat random access machine (RAM) model is not accurate for large computers (such as main frames) nor is it accurate for even smaller computers (such as storage system servers). As architectures of computer systems have evolved, many improvements have been developed for enhancing the speed with which internal storage operates.

The internal storage system today is typically hierarchical including a plurality of different internal storage units of different speeds and designs. Typically, the internal storage system includes cache units which operate at high speed (for example, the same speed as that of the processing units), includes primary units (main store units) which operate at slower speeds than the cache units, and may include secondary units which operate at even slower speeds than the primary units. In modem storage systems, the cache units are at times organized into a plurality of cache subunits where each cache subunit may be of differing capacity and speed. Similarly, primary storage units and secondary storage units within the internal storage can be formed of multiple units, with speeds varying for different patterns and volumes of access. In addition, virtual-to-real storage address translation can cause access delays in storage systems that employ virtual addressing.

In accordance with the above background, there is a need for improved sorting methods and apparatus in computers which are particularly adaptable and efficient for sorting in computers having hierarchical storage units in the storage system.

SUMMARY

The present invention is a computer system with two-dimensional tree sort and in a particular embodiment a merge tournament sort with offset-value coding.

The computer system includes internal storage for storing a list of records $R_1, \ldots, R_N$ to be sorted where each record is associated with a corresponding one of the keys $K_1, \ldots, K_N$, respectively, for ordering the records. The computer system includes at least one processing unit for processing the records and keys and for controlling the internal storage.

In order to perform the sort of N records, the processing unit forms a two-dimensional tree structure, in the internal storage of nodes. The tree structure is based upon a logical tree having a binary tree structure including a single root node and a plurality of leaf nodes. Each node, except the root node, is a child of exactly one parent node. The logical tree has ($2^m-1$) nodes (where m=ceil[$\log_2(N)$]) and where each node is a parent node of at most two child nodes. The two-dimensional tree organizes the (m) nodes of the logical tree into a plurality of subtrees, where each subtree is formed by a plurality of the nodes organized in a binary tree structure and where, if a particular node in a particular subtree is the root node in the particular subtree, then the parent node of the particular node is a leaf node in another subtree whereby the another subtree is the parent subtree of the particular subtree. For each leaf node in the tree, there is an ancestor chain of nodes (from child to parent, from parent to grand-parent, from grand-parent to great-grand-parent, ... and so on) that connects each leaf node to the root node.

In order to perform the sort, the processing unit stores codes representing keys into nodes in the two-dimensional tree and performs a tree sort of the keys using the codes. The codes are accessed by accessing the subtrees and processed to determine the sort order of the keys and the corresponding records.

The sort process involves traversing ancestor chains between leaf nodes and the root node, that is, a sequence of m child-parent pairs for each ancestor chain. The ancestor chain traversal can be either from the root node to leaf node or vice-versa, with the root regarded as the m-th generation ancestor of each leaf node. The ancestor chain traversal follows an initialization process that stores initial values into the nodes. Each ancestor chain traversal (between leaf node and root node) determines the next key in the sort order. Since there is a comparison at each node in the tree, each ancestor traversal requires m comparisons. Since there are N ancestor chains, there are Nm comparisons and these may entail Nm storage system accesses. Accordingly, the number of and efficiency of such accesses in the storage system hierarchy is of paramount importance in determining the efficiency of the sort process. In the present invention, to achieve sort efficiency, the number of storage system accesses (fetched lines) required for an ancestor chain traversal is kept low. The present invention only requires h accesses for ancestor chain traversals where h is the number of levels of subtrees, where h equals m/k, and where k equals the number of levels within a subtree.

Faster sorts are achieved having the ancestor chain traversals equal to h by organizing the logical binary tree of nodes into a tree of subtrees with h levels of subtrees. Each subtree has a binary tree structure, although the tree of subtrees does not necessarily have a binary tree structure since each subtree can have more than two child subtrees. The logical binary tree structure is preserved within the structure of the tree of subtrees since each subtree has a binary tree structure.

In a particular "loser-tree" tournament sort example of the invention, the ancestor chain traversal proceeds from leaf node to root node. First the tree is initialized to "automatic winners". To load with automatic winners, in one particular example, bit 0 of byte 0 of a codeword is set to "1".

Next the tree is loaded by processing codes for input keys in pairs for the input keys K1, ..., KN. The load proceeds with pair K1 and K2, pair K3 and K4, and so on until pair K(N–1) and KN. For each comparison of codes for key pairs, the lesser of the two comparands (in a descending sort that sorts from largest to smallest) is stored at the current tree node with the code of the greater of the two comparands used in continuing the ancestor chain traversal, that is, the code of the greater of the two comparands is compared with the contents stored at the parent of the current tree node.

When all of the N input keys have been processed, the winner at the root node is the first (largest value of all the N keys). To sort the tree, the code at the parent node of the latest winner (at the root node) is compared with an "automatic loser" and the winner is placed at that parent node. The ancestor chain traversal continues until a new latest winner is produced at the root node. The process of traversing the ancestor chain continues until all keys have been ordered, that is until an "automatic loser" becomes a winner.

The computer system with two-dimensional (2-D) merge sort of the present invention has a number of advantages.

As one advantage, the key extraction is a high speed method for implementing multi-key, bi-directional sorts. The table-driven method is efficient and following the key with a sequence pointer permits a particularly effective stability that conserves the input order of equal keys since when equal codewords force actual key comparisons, no loop test is required.

As another advantage, if the tournament tree has m levels, the 2-D tree has ceil [m/k] levels of subtrees. With the usual representation of a binary tree, the parent of the element having index q is the element with index q/2, and the ancestor chain will use (m–1) or (m–2) cache lines. The present invention, however, only requires m/k (or m/k+1) accesses of cache lines. In case data accesses displace lines, the probability of miss penalties is reduced.

The invention includes an increased benefit from pre-fetching, through the asynchronous operation of the storage system and other subsystems of the computer. Because fewer lines are involved and more instructions are executed per line (the classical definition of locality of reference is satisfied), the pre-fetch mechanism (when available on a computer as is likely with evolving architectures) has time to make advance requests to the storage system for the next-required ancestor group. Note that the leaf subtrees of a common binary tree comprise half the nodes, whereas in the 2-D structure of the present invention ($\frac{1}{2}+\frac{1}{4}+\ldots+1/(2^k)$) nodes (for more than half) are contained in the leaf subtrees. Thus a single prefetch of codes for nodes in a subtree will eliminate most misses for a single ancestor chain traversal, and the leaf subtrees can, for example, be stored in the secondary cache, thus increasing the group size n which can be effectively sorted. This advantage is illustrated in Example I and Example II hereinafter.

Enhancements to the conventional tournament sort are implemented in certain embodiments having prefetch facilities. Under a uniform distribution, the current root node will be the next winner (element in sort order) with probability ½ and analogously ¼, ⅛, ... probabilities exist for the remaining objects on the path just traversed. By prefetching the leaf node subtree of its parent (which is required if the probability prediction is correct), a several-hundred cycle miss penalty can be avoided. In addition, while processing the output list for the current winner, the required leaf node for the next ancestor chain traversal can be pre-fetched.

This ability to 'plan ahead' and thereby make use of prefetch facilities is not available for many sort algorithms (such as heapsort), and prefetching is also prohibitive because of the sheer number of access requests in conventional binary tree representations.

(3.) The address of the parent subtree of the current winner can be quickly calculated using the index and the fact that line sizes are a power of 2. By storing the record address with the key, rather than as an external node, advantage is taken of the property of merges of sorted subgroups that the key is likely to be brought into the cache, thus permitting the sort of variable length records or scattered database input.

(4.) A single load replaces two or three instructions for computing parent addresses. These loads can be interleaved with current subtree processing to eliminate pipeline delays.

As the j-th consecutive winner within the subgroup emerges, the codeword (–(N–j)), is used to commence the next iteration. These 'dummy' nodes (automatic losers or infinity) have the property that they 'win' in comparisons with other 'dummy' nodes, thus producing faster branches rather than stores as the tree is depleted. In addition this loads the tree with bit 0 of all codewords=1, eliminating re-initialization for the next subgroup.

(5.) Tournament trees are frequently used for merging as suggested by Knuth and Lorin and codeword lists obtained as above are suitable for such merge algorithms, as described in Conner, "Offset Value Coding" *I.B.M. Technical Disclosure Bulletin*, Vol 20, No. 7, December 1977. However, Quicksort offset-value codes as described by Baer and Lin, "Improving Quicksort Performance With A Codeword Data Structure", *IEEE Transactions On Software Engineering*, Vol. 15, No. 5, May 1989 cannot be so employed, thus precluding efficient cache-partitioning of data. The same algorithmic device can be used to merge sorted strings in an external sort.

Note that if $\log_2(N)$, a minimal comparison (tournament) sort will usually produce m or m–1 comparisons per dement as suggested by Knuth. However, a hardware device described in I.B.M. European Patent Application #91104337.0 Database Processing System (3/20/91) must perform m comparisons.

The present invention, by way of distinction structures the merge tree as in a conventional tournament sort to provide for minimal comparisons. Since the number of merge lists is usually small relative to n, the addressing speed-up is achieved by creating on-the-fly a table of half-word relative parent pointers. By the same token, cache misses on this small tree are improbable, and the second dimension is not needed.

The implementation of the present invention in IBM BAL for System/390 for the Amdahl HURON and UTS COBOL compiler products demonstrates speed-ups of over 20 times compared with UNIX C sorts and parity or better with the most highly optimized MVS products (20% estimated average in-core sort gain over Syncsort 3.4).

On the other hand, the SPARC (Sun) implementation of the 2-D tree of the present invention executes a comparison so efficiently (3.5 cycles) that the 2-D sort is used for all merge algorithms. The Sun SPARC implementation internal sort measures a 100–200 times speedup over UNIX (Solaris OS) sort, 10–20 times over Oracle sort, and 4–7 times over Syncsort for Unix Rel 1.

The foregoing and other objects, features and advantages of the invention will be apparent from the following detailed description in conjunction with the drawings.

DESCRIPTION OF THE DRAWINGS

FIG. 5 depicts a representation of a tree-with ($2^{20}$–1) internal nodes, with $2^{19}$ leaf nodes and $2^{20}$ keys.

DETAILED DESCRIPTION

Figure 1:
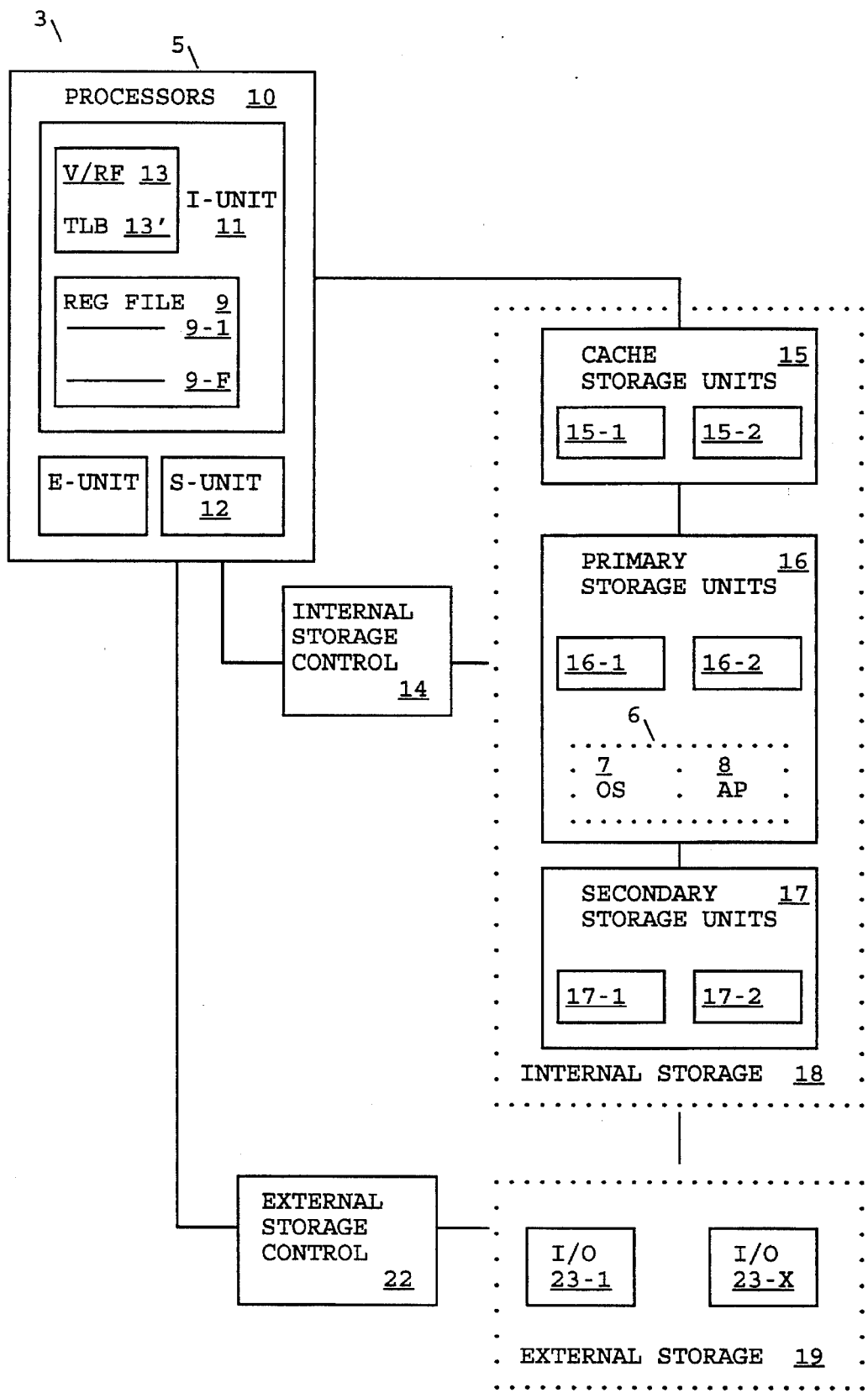
FIG. 1 depicts a block diagram of the computer system of the present invention.

Computer System General—FIG. 1

The computer system 3 of FIG. 1 is composed of hardware 5 and software 6. The hardware 5 includes one or more processors 10, typically a central processing unit (CPU), internal storage control 14 and internal storage 15, external storage control 22 and external storage 19. The internal storage 18 includes one or more cache storage units 15 and is shown with a first cache unit 15-1 and a second cache unit 15-2. The internal storage 18 includes one or more primary storage units 16 that constitute the main store of the computer system and the primary storage units 17 are shown with a first primary unit 16-1 and a second primary unit 16-2 by way of example. The internal storage 18 includes one or more secondary storage units 17 that are shown with a first secondary unit 17-1 and a second secondary unit 17-2 by way of example. The external storage 19 includes one or more I/O storage units 17 and is shown with X I/0 units 23-1, ..., 23-X.

The software 6 includes an operating system 7 and user (application) programs 8. The computer system 3 executes user programs 8 in the hardware 5 under control of the operating system 7.

Referring to FIG. 1, the operating system can be, for example, the UNIX operating system that has fries and processes that execute under the control of a kernel. A process is a computer program in a state of execution. The computer system of FIG. 1, when running the UNIX operating system, has three levels of operation: user, kernel, and hardware. Typically, application programs 8 run at user level, and request the services of the operating system 7 by means of system calls. Application programs of particular interest in the present invention employ sort algorithms.

The kernel acts as a resource manager for all of the resources of hardware 5 of the computer system 3 of FIG. 1. Primarily the kernel has two functions. The first is to provide a large degree of device independence to the application programs by masking details of the various hardware resources needed during computation. The second is to perform various supervisory and control functions so that the needed resources are scheduled as necessary. The kernel is partitioned into a process control subsystem, a file management subsystem, a memory management subsystem, and other supporting subsystems.

The process control subsystem creates or terminates processes in response to explicit or implicit user requests, controls process behavior, obtains the resources that are necessary from the other subsystems for process execution, and provides means for inter-process communication. Chief among the resources that a process needs during execution are usage of the processors 10, usage of internal storage 18, access to data stored on external storage 19, and other facilities.

The memory management subsystem regulates the use of internal storage 18 for efficient, protected, and convenient access to programs and dam, and coordinates with file management subsystem so that file data is transferred between internal and external storage as needed by processes. In most UNIX operating system versions, the memory management subsystem provides the convenient illusion of a linear space in which processes can expect to reference the data or code that they need during execution, although the internal storage 18 employed for meeting this need is neither linearly nor continuously present for a specific process. This illusion is supported by managing the internal storage in small units of allocation, called pages, and by dynamically adjusting the mapping between process generated references (also called addresses) and the pages into which the data accessed by these references reside.

The page tables maintaining these mappings may migrate within the internal storage system hierarchy during address translation, increasing the departure of a modern system from the simple RAM model of computation that has heretofore been assumed when analyzing sort algorithms.

Over the duration that the operating system executes a specific process on a processor, the processor is said to be functioning in the context of the process. The context of a process refers to the overall hardware and software state of a processor that makes it possible for the memory references generated during the process execution to map correctly to the physical addresses that contain the instructions or data needed for computation. Accordingly, the context of a process is defined by all the machine register contents that need to be saved at the time that the process control subsystem 35 disembarks the process from execution on a processor. This "saved context" information must be subsequently restored on a processor, in order to continue the execution of that process on the processor. The operation of a processor of stopping the execution of one process, saving its context, and restoring the context of a second process, so that the second process uses the processor instead of the first process, is called a context-switch.

The file management subsystem commonly comprises one or more file systems, each of which spans a single logical partition or subdivision of an external storage medium such as a disk, and which organize the data within that partition. Generally, multiple implementations of file systems are available, each providing a common set of services to the remainder of the operating system and differentiated from other implementations by virtue of specialized functions and structure that are appropriate for the specific uses intended by the implementation. The common set of services offered by various file system implementations to the other kernel subsystems is generally called the Virtual File System interface.

The transfer of data between internal storage and external storage I/O devices such as disks, terminals, or printers, and the control of such devices, is accomplished by the services of kernel modules called device drivers.

The transfer of data between internal storage units and the processors 10 is typically under control of different units that constitute the processors 10. Increasingly in computer architectures, an instruction unit (I-UNIT 11 of FIG. 1) is responsible for fetching and processing instructions, and a storage unit (S-UNIT 12 in FIG. 1) is responsible for controlling the accessing of information in internal storage 18. Where the computer system of FIG. 1 organizes information in the system on a virtual basis, then the processors 10 include a virtual-to-real translation facility (V/RTF) for converting between virtual and real addresses. Typically, the V/R translation facility 13 includes a translation-lookaside-buffer 13' (TLB) that is used to assist in address translations between virtual and real addresses. Also, the processors 10 include register files 9 that include F registers 9-1, 9-2, ..., 9-F for rapid access to information used in executing programs. Typically registers in file 9 are 32-bit or 64-bit registers.

Figure 2:
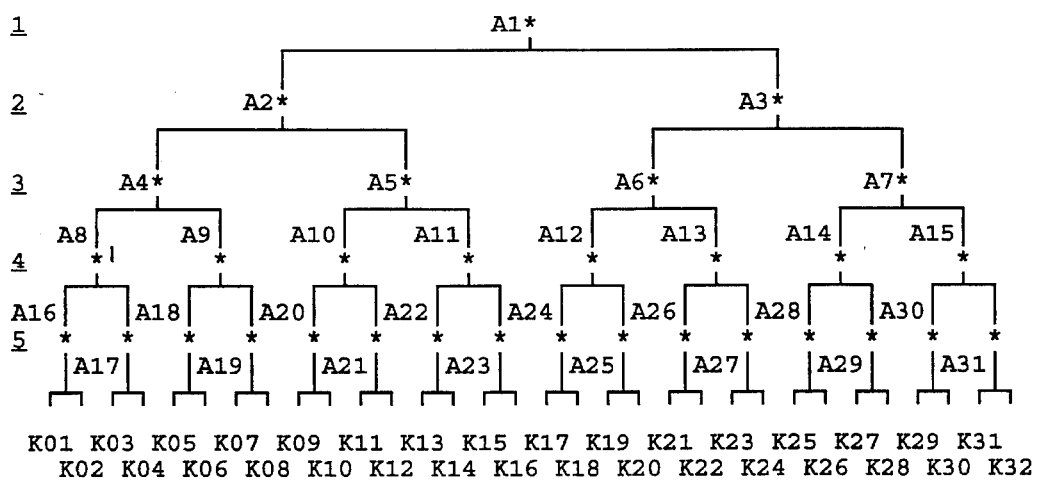
FIG. 2 depicts a representation of a 31-node, 5-node-level binary tree for sorting 32 records.

Binary Tree—FIG. 2

FIG. 2 depicts a representation of a logical binary tree that is formed in internal storage 18 of FIG. 1 for sorting N records $R_1, \ldots, R_N$ ordered by the keys $K_1, \ldots, K_N$, respectively, extracted from those records. In FIG. 2, by way of example, N equals 32. Each node $A_q$ of the tree is used to store codeword/index information, $C_q$, representing one of the keys $K_1, \ldots, K_N$.

In FIG. 2, the keys $K_1, \ldots, K_N$ are to be sorted by storing codes at locations defined by nodes in internal storage 18 of FIG. 1. To execute the sort process, a logical binary tree structure of binary nodes is formed. A binary node is a node with at most one parent node and two child nodes. In FIG. 2, the binary nodes are designated by an "*". The binary tree structure includes the N−1 nodes $A_1, A_2, \ldots, A_q, \ldots, A_{N-1}$. Each of the binary nodes in the tree structure, in general, includes one parent node and two child nodes where the parent of any child $A_q$ is $A_{q/2}$. The binary tree structure has the root node $A_1$ which has two child nodes, $A_2$ and $A_3$, but no parent node and includes the leaf nodes $A_{(N/2)}, A_{(N/2+2)}, \ldots, A_{(N-1)}$ which each have a parent node but no child nodes, per se, in the tree structure. However, the leaf nodes $A_{(N/2)}, A_{(N/2+1)}, \ldots, A_{(N-1)}$ each are associated with two keys in a parent child relationship. For example, $A_{N/2}$ is associated with $K_1$ and $K_2$, $A_{(N/2+1)}$ is associated with $K_3$ and $K_4$ and so on with $A_{(N-1)}$ associated with $K_{(N-1)}$ and $K_N$.

In FIG. 2, the sort process is commenced with an initialization process during which nodes $A_{(1)}, \ldots, A_{(31)}$ are stored with initial values that are "automatic winners".

Next, in FIG. 2, the sort process traverses ancestor chains between each of the leaf nodes $A_{(N/2)}, \ldots, A_{(N-1)}$, that is, leaf nodes $A_{(16)}, \ldots, A_{(31)}$, and the root node $A_1$. The ancestor chain traversal is a sequence of $m=\text{ceil}[\log_2(N)]$ child-parent pairs which, since N=32 in FIG. 2, is 5 pairs. The traversal can be either from the root node to a leaf node or vice-versa, with the root regarded as the m-th generation ancestor of the particular leaf node. By way of example, if the ancestor train traversal starts with leaf node $A_{24}$, then the ancestor chain is $A_{24}$ to $A_{12}$, $A_{12}$ to $A_6$, $A_6$ to $A_3$, $A_3$ to $A_1$ or more succinctly $A_{24}, A_{12}, A_6, A_3, A_1$. By way of further example, if the ancestor chain traversal starts with leaf node $A_{16}$, then the ancestor chain is $A_{16}, A_8, A_4, A_2, A_1$.

In FIG. 2, each ancestor traversal requires 5 comparisons (m=5). Since there are 32 ancestor chains, there are 32*5= 160 (N*m) comparisons and 160 storage system accesses. The present invention reduces the number of fetches for each ancestor chain traversal from 5 fetches common in the prior art to 2 (ceil[m/k] where m=5 and k=4) for a total of 64 (32*2).

Figure 3:
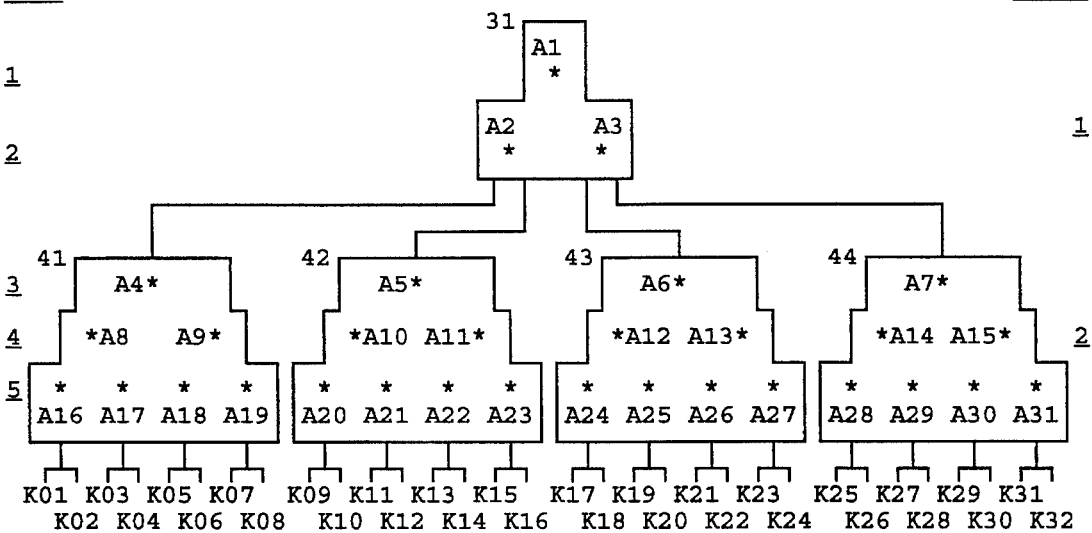
FIG. 3 depicts a representation of the binary tree of FIG. 2 organized into a subtree structure formed of a tree of subtrees with two rows of subtrees where each subtree, other than the root subtree has three binary levels.
Figure 4:
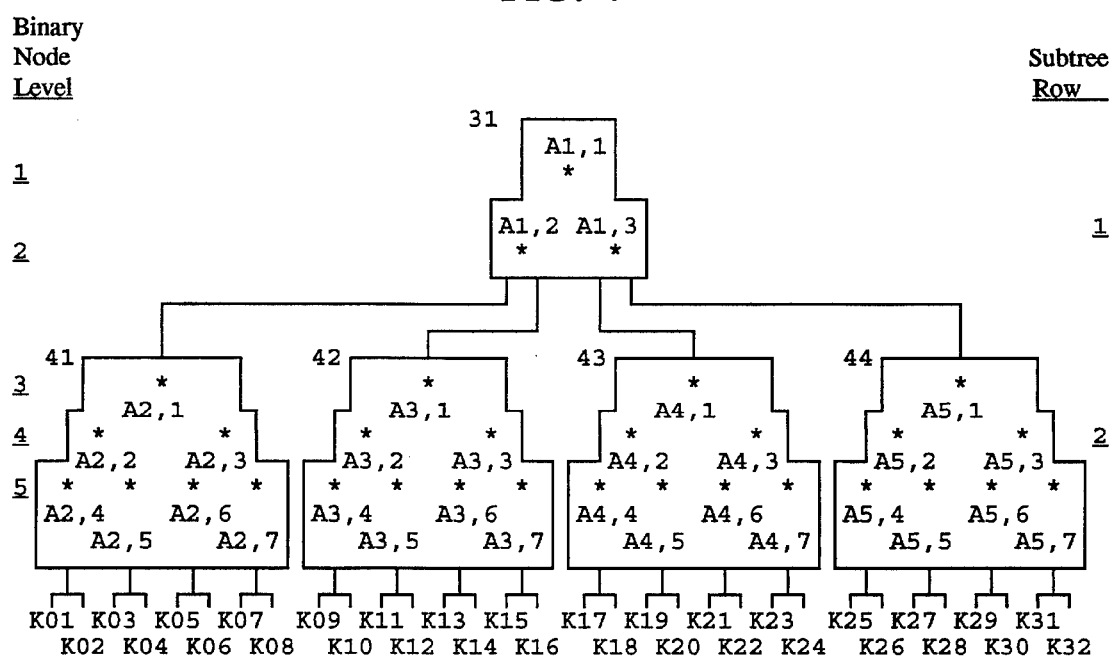
FIG. 4 depicts a representation of the subtree structure of FIG. 3 using the $A_{ij}$ 2-D notation.

In order to achieve faster sorts, the m-node ancestor chain traversal is achieved with m/k storage system accesses, the logical binary tree of FIG. 2 is organized into a tree of subtrees as shown in FIG. 3.

The tree of subtrees structure for the logical binary tree of FIG. 2 in FIG. 3 is an example where N equals 32. In FIG. 3, two rows of subtrees are shown. The row 1 subtree 31 includes three binary nodes of FIG. 2, $A_1$, $A_2$, and $A_3$ in two binary levels that form a single root subtree. Row 2 includes 4 subtrees 41, 42, 43 and 44 each subtree having 7 binary nodes in three binary levels. The tree of subtrees of FIG. 3 is not a binary tree since the root subtree 31 has four (not two) subtrees. The logical structure of the logical binary tree of FIG. 2 is preserved within the structure of the tree of subtrees in FIG. 3, since each subtree in FIG. 3 has a binary tree structure.

For a "loser-tree" tournament sort, using the 2-D tree of FIG. 3, the ancestor chain traversal proceeds from leaf node to root node. First the tree is initialized to "automatic winners". To load with automatic winners, in one particular example, bit 0 of byte 0 of a codeword is set to "1".

Next the tree is loaded by processing codes for input keys in pairs for the input keys K1, . . . , KN. The load proceeds with pair K1 and K2, pair K3 and K4, and so on up to K(31) and 32. For each comparison of codes for key pairs, the lesser of the two comparands (in a descending sort that sorts from largest to smallest is stored at the current tree node with the code of the greater of the two comparands used in continuing the ancestor traversal, that is, the code of the greater of the two comparands is compared with the contents stored at the parent of the current tree node.

To sort the tree, the code at the parent node of the latest winner (at the root node) is compared with an "automatic loser" and the winner is placed at that parent node. The ancestor chain traversal continues until a new latest winner is produced at the root node. The process of traversing the ancestor chain continues until all keys have been ordered, that is until an "automatic loser" becomes a winner. Notation used herein is as follows:

Notation:

$N$ = number of objects $A_1, \ldots, A_N$ to be sorted $Cw$ = length of each codeword, in bytes, $Lz$ = cache line size, in bytes $L$ = number of codewords that fit in a cache line
= $Lz/Cw - 1$ $k$ = number of binary node levels within subtree, other than root subtree
= $\log_2(L+1)$ $m$ = number of node levels for binary tree for $N$ objects
= $\text{ceil}[\log_2(N)]$ $r$ = number of node levels within root subtree
= $m[\text{mod}]k$ $R$ = number of nodes within root subtree
= $2^r - 1$ $h$ = number of levels of subtrees
= $\text{ceil}[m/k]$ $A_q$ = node $q$ within logical binary tree $A_{ij}$ = node $j$ within subtree $i$ of tree of subtrees In order to perform the sort, the following steps are performed:

(1.) Key extraction: The input records (from a database, flat file, compiler internal record, or otherwise) are scanned for keys and all keys are converted to strings comparable by machine instructions, with bits of ascending keys inverted. Optionally a sequence number or record address is appended.

(2.) A tournament tree is initialized as a tree of subtrees of size $2^k$, where the cache line size of the given machine=$2^{(3+}$ $k)$ bytes. The root doubleword (or quadword for architectures with 64-bit registers) is reserved for pointers to the ancestor chain within the subtree whose leaf node is the parent dement of the root of the current subtree. The initialization process establishes the pointers. For a doubleword architecture, a preferred embodiment contemplates line sizes from 32 to 256 bytes. The number of subtrees depends on the size of the primary cache and the presence of a secondary cache, so that the total tree size is N elements.

If $\log_2(N)=m$ and $m [\text{mod}] k>0$, the root subtree is adjusted to contain $m [\text{mod}] k$ levels, so that all other cache lines are fully utilized.

(3.) The N keys are subdivided into groups of n elements, with a remainder $N [\text{mod}] n$. Codewords in one example formed of 8 bytes for use in computer systems having 32-bit registers are as follows:

byte 0
bit 0=reserved as indicator of "automatic winner" in load phase or "automatic loser" ("infinity") in sort phase.
bits 2–7=indicator of full word (bytes/4) offset within the key at which the loser differed from the prior comparand (initially 0).
bytes 1–4—copy of the fullword at which the inequality was detected.
bytes 5–7—three byte index of key In the 32-bit register example above, the bytes 0–3 are conveniently stored in a first register, for example, register 9-1 and bytes 4–7 are store in register 9-2 in FIG. 1. The embodiment described does not require an expensive indirect key access of internal storage with a 1-cycle register comparison (bytes 0–3). If a second test is required of byte 4 due to the equality of the first fullword (bytes 0–3) of both comparands, then a branch is taken to a secondary comparison routine. Note that the codewords can be selected with any convenient size, for example, to maximize key length or utilize 64-bit registers in computer systems having such registers.

A sample 8-byte codeword (for keylengths of 24 for $K_1$, . . . , $K_N$) is as follows:

| byte | | | | | | | |
|---|---|---|---|---|---|---|---|
| 0 | 1 | 2 | 3 | 4 | 5 | 6 | 7 |
| x'04' | A | B | C | D | x'00' | x'00' | x'11' |

The meaning of the sample 8-byte codeword is as follows:
i) Byte 0 has offset hex 04 that indicates 4th fullword inequality detected at bytes 16–19
ii) Bytes 1, 2, 3 and 4 indicate that bytes 16–19='ABCD'
iii) Bytes 5, 6 and 7 indicate that the loser of the comparison is $K_{17}$ (17= hex 000011), whose partial key value is incorporated in codeword bytes 1–4

(4.) As each subtree is traversed, the pointers to the ancestors within the parent subtree are loaded into an alternate set of registers from those currently in use. Codewords are stored in sort order. The following LISTING 1 is a fragment of a routine that performs a nodal comparison of an ancestor chain traversal of a two-dimensional tree using offset value codes.

LISTING 1
© COPYRIGHT 1994 AMDAHL CORPORATION

```
*Start with R4 pointing to root of second subtree and R7 pointing to offset of leaf node within
*subtree
NT21      C    R0, 0(R4,R7)    *Compare codeword of current winner with node
          L    R8, 0(R4)       *Load pointer to root of parent subtree
          BH   NT22            *Branch if still winner to routine for parent node within
                                subtree
          BE   CMP21           *Branch to routine for byte 4 comparison
          L    R2, 0(R4,R7)    *Exchange R0–R1 with codeword stored at node
          L    R3, 4(R4,R7)
          ST   R0, 0(R4,R7)
          ST   R1, 4(R4,R7)
          LR   R0, R2
          LR   R1, R3
NT22           *Comparison routine for parent of leaf node within second subtree
               .
               .
               .
NT31           *Comparison routine for root node within parent subtree
               .
               .
               .
CMP21          *Routine for byte 4 comparison for subtree 2, leaf node
               *Branch to key comparison if byte 4 of both comparands are equal
```

(5.) The sets of n keys are merged via the codeword lists.

Since there is a 1-to-1 correspondence between the nodes $A_{i,j}$ and in the tree of subtrees the nodes $A_q$ in the logical binary tree, the relationship between the tree of subtrees index pair (i,j) and the logical node index q can be calculated based on the following:

(a) Within a subtree i, enumerated as $A_{i,1}, A_{i,2}, \ldots, A_{i,L}$, the parent of $A_{i,j}$ is $A_{i,j/2}$. Each level s, $0<s<k$, is enumerated as $\{2^s+p: p<2^s\}$.

If $A_{i,1}=A_q$, then
$A_{i,j}=A_{i,(2^s+p)}=A_{2^s q+p}$, as the correspondence must preserve descendants.

(b) Let V be a subtree level. The number of subtrees on level V is $$\begin{cases} 1 & \text{if } V=0 \\ 2^r 2^{k(V-1)} & \text{otherwise,} \end{cases}$$

where:

$2^r$=number of descendants of leaf nodes of root subtree $2^k$=number of descendants of leaf nodes of all other subtrees The number of subtrees on levels 0–V is $1+\Sigma\{2^r 2^{kv}: v=0, \ldots, V-1\}$ The level of subtree i is $V_i = 1 + \max\{V: (1+\Sigma\{2^r 2^{kv}: v=0, \ldots, V-1\}) < i\}$ The number of subtrees on prior levels is:

$v_i = 1 + \Sigma_{v=0,\ldots,v_i-1} 2^r 2^{kv}$

If $q_0 = i - v_i$, (i is the $q_0$-th tree on level $V_i$)
$q_1 = R + (v_i - 1)L$
where $q_1$ is the number of nodes on all prior subtree levels
then,
the root of subtree i, $A_{i,1}$ corresponds to $A_q$, where:

$q = q_1 + q_0$

-continued and $A_{ij} = A_{i,23} + p$
$= A_{2^s q + p}$

For example, where 2048 records are to be sorted,
N=2048
Lz=64
Cw=8
Then k=3
L=7
m=11
r=2
R=3
$A_{45,3}=A_q$ Computing the logical index q for the node whose codeword is stored on the 4-th Cw multiple of subtree 45, $V_i=3$, since
$1+4+4*8=37<45<1+4+4*8+4*8*8$.

$R+(4+4*8)*L=255$=total number of nodes on all prior subtree levels $q_0=8$
$q_1=255$ So q=263 and $A_{45,1}=A_{263}$ and $A_{45,3}=A_{45,2+1}=A_{263*2+1}=A_{527}$ Two examples of the 2-D computational advantages of the present invention are described in connection with FIG. 5.

Example I

Assume in the example that a sort is confined to 64 megabytes of main memory on a system with a 1-MB secondary cache (with 100 cycle miss penalty and 64-entry TLB) and 128-byte secondary cache line size. In the example, assume the sort consists of 1M records, and replacement selection has been adopted with offset-value coding, necessitating an 8 MB codeword tournament (or heap) tree. $\log_2(N)=20$, and with a conventional tree the lowest three level accesses (of the 20 comparisons in a traversal) will require main memory requests +TLB replacement+page table entry main memory request.

Assuming 25 cycle TLB penalty, the total is as follows:

$$3 * (100+25+100)=775 \text{ cycles.}$$

With a two-dimensional structure, only the leaf subtree would miss, saving 500 cycles. Moreover, due to the economy of main memory accesses, the probabilistic pre-fetch can eliminate the remaining 225 cycles so that together in embodiments of the present invention 775 cycles are saved.

For a 100 Mhz processor, the savings is as follows:

$$1M \text{ keys} * 775 \text{ cycles} * 10 \text{ nanoseconds}=7.75 \text{ seconds.}$$

This savings of 7.75 seconds is likely to be more than the total sort CPU time without cache misses. Moreover, a 32 MB/sec RAID device would only take 4 seconds total to read and write the file again demonstrating the significance of the savings in accordance with the present invention.

Example II

For Example II, the structure of Example I is used together with a 24k primary cache with 32-byte line size. Assume the keys are 8-digit octal numbers, so that there is a probability of 1/4096 of the first fullwords of two randomly chosen keys being found equal. Using a merge tournament sort with offset value coding, 3k codewords fit in the primary cache, so the algorithm which partitions the data into 3k quantities will not detect the equal codewords until the lists are merged. During the merge, the obligatory key access will entail the 225 cycle penalty mentioned in Example I. With a two-dimensional tree, a structure with 8k codewords is employed. Leaf subtree prefetching therefore eliminates most of the primary leaf misses, and the equal codewords with high probability will be detected during sorts of the respective partitions, with only secondary cache accesses necessary to retrieve the keys.

Note that the leaf subtrees of a common binary tree comprise half the nodes, whereas in the 2-D structure of the present invention $(\frac{1}{2}+\frac{1}{4}+\ldots+1/(2^k))$ nodes are contained in the leaf subtrees. In FIG. 5, for example, the leaf nodes in the leaf subtrees are those in subtree row 5 that include all the nodes in binary levels 20, 19, 18, and 17 (524,288+262,144+131,072+65,536).

Appendix Code Listing

A specific code listing useful in connection with the present invention appears in the attached APPENDIX A, KEY EXTRACTION FOR 2-D TOURNAMENT SORT and APPENDIX B, 2-DIMENSIONAL TOURNAMENT SORT WITH OFFSET VALUE CODING. A computer program including the code of APPENDIX A and APPENDIX B is executed in the FIG. 1 system first by doing the key extraction of APPENDIX A followed by execution of APPENDIX B. Key extraction is important for reducing the quantity of data that needs to be stored in higher speed cache internal storage. Also, for systems that do not provide for easy word boundary alignment, the key extraction routine is suitable for providing word boundary alignment of the information used in the actual sorting so that the speed of the sort process is materially increased.

In accordance with the above description, the present invention is a computer system including storage means in the form of internal storage 18 of FIG. 1 for storing a list of records $R_1, \ldots, R_N$ to be sorted where each record is associated with a corresponding one of the keys $K_1, \ldots, K_N$, respectively, for ordering the records. A processing means such as processors 10 if FIG. 1 are for processing the records and keys and for controlling the storage means. The processing means includes computer software for forming a two-dimensional tree having a tree structure in said storage means formed of nodes including a single root node and a plurality of leaf nodes where each node except the root node is a child of exactly one parent node as shown in FIGS. 2–5 and wherein as shown in FIG. 2 the nodes form a logical tree having a binary tree structure where each node is a parent node of at most two child nodes. Also the two-dimensional tree as shown in FIG. 3 is organized into a tree structure of a plurality of subtrees, where each subtree is formed by a plurality of the nodes organized in a binary tree structure, and where for each particular node in a particular subtree that is the root node in the particular subtree, then said particular node has a parent node that is a leaf node in another subtree whereby said another subtree is the parent subtree of the particular subtree. In FIG. 3, the root subtree 31 is the parent of the leaf subtrees 41 to 44. The computer software of APPENDIX B includes software for storing codes representing keys into the nodes and sort software for performing a tree sort of said keys using the codes by accessing the codes in subtrees.

In accordance with the present invention, a two-dimensional merge tournament sort using offset-value coding provides increased efficiency on computers with multiple levels of storage access with hierarchical costs. Specifically, the two-dimensional structure a) increases cache locality of reference, reduces path length, and enhances pre-fetch logic; b) permits increased codeword length with allied subroutines to enhance the utility of registers as compared with prior implementations; c) employs tournament sort flags to increase low-cost branching paths; d) employs a merge routine which reduces costly secondary hierarchy penalties via pre-fetch logic; e) employs a fast stable sort (Appending Index) FIFO for equal keys.

In connection with the above, stored pointers used to reduce path length and cache lines are efficiently used by formation of natural subtrees so that ii.a) fewer cache lines are accessed per tournament tree traversal, and ii.b) probabilistic and direct pre-fetching of leaf subtrees is facilitated by increased cycles per cache line, resulting in fewer pre-fetches per unit of time.

In connection with the above, leaf subtrees comprise a higher percentage of nodes than leaf nodes of conventional binary tree structure and this condition permits larger trees with minimal secondary penalties.

The present invention usefully employs longer registers that are available with newer architectures and allows split comparison routines for registers 0 and 1 of a register pair that permits a high probability of faster execution.

Also the present invention requires fewer accesses to keys in remote storage due to codeword length.

The use of decremented counters for the equivalence with 'infinity' or 'automatic loser' reduces wasteful stores and tests.

Finally, potential penalties associated with key extraction are eliminated by cache-pre-fetch.

While the invention has been particularly shown and described with reference to preferred embodiments thereof it will be understood by those skilled in the art that various changes in form and details may be made therein without departing from the spirit and scope of the invention.

APPENDIX A, KEY EXTRACTION FOR 2-D TOURNAMENT SORT
© COPYRIGHT 1993 AMDAHL CORPORATION

```
1              TITLE 'TSRTEXT - KEY EXTRACTION FOR TOURNAMENT SORT'
2    TSRTEXT   CSECT
3    TSRTEXT   AMODE   31
4
5    ****************************************************************
6    *                                                              *
7    * TSRTEXT - KEY EXTRACTION FOR 2-D TOURNAMENT SORT:            *
8    *           OUTPUT (SORTKEYS+ROWPTR) FOR EACH ROW IN LINKED PAGES *
9    *                                                              *
10   * INPUT   - R1+0= ADDR OF SRTBLK DSECT                         *
11   *                 SRT1STBK - POINTER TO 1ST BLOCK OF EL-RECORDS *
12   *                 SRTSPECS - POINTER TO (DFSORT) SORT SPECS    *
13   *                 SRTLRECL - SIZE OF RECORDS TO BE SORTED      *
14   *                 SRTCNT   - TOTAL NO. OF RECORDS              *
15   *                 SRTKPTR  - SCRATCH AREA FOR (KEYS+SEQNO+PTR)'S *
16   *                                                              *
17   * OUTPUT  - SRTKPTR = AREA HAS EXTRACTED (KEYS+SEQNO+PTR)'S    *
18   *                                                              *
19   * NOTES:                                                       *
20   *    KEY EXTRACTION - SPECIFIED (KEY) FIELDS ARE CONVERTED INTO *
21   *        A LIST OF STRINGS SUITABLE FOR CL (COMPARE LOGICAL)   *
22   *        SORTING. ASCENDING FIELD BITS ARE INVERTED, SIGNS     *
23   *        AND PACKED DATA MODIFIED, AND LENGTH BYTES APPENDED   *
24   *        TO PRESERVE HURON COMPARISON CONVENTIONS.             *
25   *                                                              *
26   *        A CERTAIN AMOUNT OF CODE REPLICATION AND RE-ORDERING  *
27   *     (I.E. SCHEDULING) IS DONE FOR PERFORMANCE.               *
28   *                                                              *
29   ****************************************************************
30
```

APPENDIX A, KEY EXTRACTION FOR 2-D TOURNAMENT SORT
© COPYRIGHT 1993 AMDAHL CORPORATION

```
31    *
32           $SAVE STACKLEN,ALIGN=DOUBLE   SAVE CALLER'S ENVIRONMENT   @01
33    *                                                                @01
34           USING SAVETAM,R13             ... SAVE AREA STACK,        @01
35           USING SRTBLK,R3               ... SORT CONTROL BLOCK      @01
36           B     START                                               @01
37           SPACE 3                                                   @01
38           PGMID                                                     @01
39           EJECT                                                     @01
40    START  DS    0H                                                  @01
41           L     R3,0(R1)                                            @01
42           USING SRTBLK,R3               ... SORT CONTROL BLOCK      @01
43    *
44           MVC   BLKPTR,SRT1STBK
45    *
46           ZAP   PK8,=PL8'0'             INITIALIZE
47           MVC   RECCNT,SRTCNT                                       @00
48    *
49    *     XSTR IS INITIALIZED TO X'FF', MODIFIED TO X'00'
50    *     FOR DESCENDING KEY BITS, AND XOR'ED WITH A PORTION
51    *     OF EACH KEY
52    *
53    *
54           LA    R14,XSTR
55           LA    R15,508
56           LA    R8,0
57           L     R9,=X'FF000000'
58           MVCL  R14,R8
59    *
60    *-----------------------------------------------------------------*
61    *. EXTRACT SRTSPECS INTO TABLE FLDD={OFFSET,LEN,TYP,A/D}X16
62    *-----------------------------------------------------------------*
63           L     R4,SRTSPECS             DFSORT/TAM13 PARM LIST
64           LH    R5,0(R4)                SORT STR LL
65           LA    R7,2(R4)
66    *
67           LR    R6,R7
68           LA    R10,FLDD
69           LA    R11,0
70           LA    R9,0
71    *
72    *     PARSED DATA STORED IN TABLE FLDD
73    *         HW  OFFSET, LENGTH, TYPE, DIRECTION
74    *
75    *
```

APPENDIX A, KEY EXTRACTION FOR 2-D TOURNAMENT SORT
© COPYRIGHT 1993 AMDAHL CORPORATION

```
76    LP1    TRT     0(255,R7),TRTBL
77           SR      R1,R7
78           SR      R5,R1
79           BCTR    R1,0
80           EX      R1,EXPK
81           LA      R7,2(R1,R7)
82           CVB     R1,PK8
83           STH     R1,0(R10)         FIELD OFFSET
84    *
85           TRT     0(255,R7),TRTBL
86           SR      R1,R7
87           SR      R5,R1
88           BCTR    R1,0
89           EX      R1,EXPK
90           LA      R7,2(R1,R7)
91           CVB     R1,PK8
92           STH     R1,2(R10)         FIELD LENGTH
93    *
94           AR      R11,R1
95    *
96           CLI     0(R7),C'P'
97           BNE     *+6
98           BCTR    R11,0             PD FIELD OMITS LENGTH BYTE
99    *
100          MVC     4(2,R10),0(R7)    TYPE
101          MVI     6(R10),C' '
102          MVC     7(1,R10),3(R7)    DIRECTION
103          LA      R7,5(R7)
104          LA      R10,8(R10)
105          LA      R9,1(R9)
106          S       R5,=F'7'
107          BNM     LP1
108   *
109   LP3    ST      R11,SRTKEYLN      KEYLENGTH
110          ST      R9,FLDN           NO. OF FIELDS
111   *
112   *      ADJUST OFFSETS AND LENGTHS FOR EX
113   *
114   *
115          LA      R10,FLDD
116          LA      R11,XSTR
117   LP4    LH      R6,0(R10)
118          LH      R7,2(R10)
119          BCTR    R6,0
120          BCTR    R7,0
```

APPENDIX A, KEY EXTRACTION FOR 2-D TOURNAMENT SORT
© COPYRIGHT 1993 AMDAHL CORPORATION

```
121             LR      R8,R7
122             BCTR    R7,0            REDUCE FOR LENGTH CODE
123             STH     R6,0(R10)       OFFSETS & LENGTHS FOR EX
124             STH     R7,2(R10)
125     *
126             CLI     4(R10),C'P'
127             BNE     *+6             PD FIELDS OMIT LENGTH CODE
128             BCTR    R8,0
129     *
130             CLI     7(R10),C'D'
131             BNE     NODESC
132     *
133     *   ZAP BYTES OF DESCENDING FIELDS WITHIN XSTR
134     *       MAX KEY LENGTH IS 508
135     *
136             C       R8,=F'255'
137             BNH     EXDESC
138             XC      0(255,R11),0(R11)
139             LR      R5,R8                                           @00
140             S       R5,=F'255'                                      @00
141             LA      R14,255(R11)
142             EX      R5,EXXC2                                        @00
143             B       NODESC
144     EXDESC  EX      R8,EXXC         ZERO FIELD BYTES IN XC STR
145     *
146     NODESC  LA      R10,8(R10)
147             LA      R11,1(R8,R11)                                   @00
148             BCT     R9,LP4
149     *
150     *   LOCATE THE FIRST AND LAST BYTES OF ASCENDING FIELDS
151     *       TO REDUCE THE LENGTH OF THE XC
152     *
153     *
154             L       R10,SRTKEYLN
155             LA      R11,XSTR
156     LP4A    CLI     0(R11),X'FF'
157             BE      LP4AA
158             LA      R11,1(R11)
159             BCT     R10,LP4A
160     LP4AA   ST      R11,XCAD        FIRST BYTE
161             LA      R10,XSTR
162             SR      R11,R10
163             ST      R11,XCST        OFFSET
164     *
165             L       R10,SRTKEYLN
```

APPENDIX A, KEY EXTRACTION FOR 2-D TOURNAMENT SORT
© COPYRIGHT 1993 AMDAHL CORPORATION

```
166              LA        R11,XSTR(R10)
167              BCTR      R11,0
168     LP4B     CLI       0(R11),X'FF'
169              BE        LP4C
170              BCTR      R11,0
171              BCT       R10,LP4B              LAST ASC BYTE
172     *
173     LP4C     LA        R10,XSTR
174              SR        R11,R10
175              S         R11,XCST              OFFSET OF FIRST ASC FIELD
176              ST        R11,XCLEN
177              C         R11,=F'255'           ASC FIELDS > 255 BYTES ?
178              BL        XC255
179     *
180              S         R11,=F'255'
181              ST        R11,XCLEN             EX XC LEN
182     *
183     *                  REPLACE  ASC/DES HW WITH BRANCH OFFSETS
184     *        OF EXTRACT ROUTINE FOR NEXT FIELD IN KEY.
185     *
186     *
187              L         R9,=A(LP6P2-LP5PB)    XC ROUTINE
188              B         FLDBR
189     XC255    L         R9,=A(LP6PB-LP5PB)
190              TM        XCLEN,X'80'           DESCENDING SORT
191              BNO       *+8
192              L         R9,=A(LP6PB+4-LP5PB)
193     *
194     FLDBR    LA        R5,FLDD
195              L         R10,FLDN
196     *
197              LR        R2,R10
198              SLL       R2,3
199              LH        R4,FLDD               OFFSET AND LENGTH FOR FLD 1
200              LH        R8,FLDD+2
201              AL        R4,SRTLRECL           ... OF FOLLOWING RECORD
202              STH       R4,FLDD(R2)
203              STH       R8,FLDD+2(R2)
204     *
205              LA        R6,0
206              L         R7,=A(MVB-LP5PB)
207              L         R8,=A(MVPD-LP5PB)
208              BCTR      R10,0
209              LTR       R10,R10
210              BZ        LP4F
```

APPENDIX A, KEY EXTRACTION FOR 2-D TOURNAMENT SORT
© COPYRIGHT 1993 AMDAHL CORPORATION

```
211    LP4D      CLI     12(R5),C'C'          CH, BI OR PD ?
212              BL      LP4DB
213              BH      LP4DPD
214              CLC     10(2,R5),=H'128'     CHECK CHAR FIELD LENGTH
215              BNL     LP4VL
216              STH     R6,6(R5)
217              B       LP4E
218    LP4VL     CLC     10(2,R5),=H'254'
219              BNL     LP4VL2
220              MVC     6(2,R5),=Y(MVVLC-LP5PB)    ROUTINE FOR 128-255 LL
221              B       LP4E
222    LP4VL2    MVC     6(2,R5),=Y(MVVLC2-LP5PB)   > 255
223              B       LP4E
224    LP4DB     LH      R11,8(R5)            OFFSET
225              LA      R11,4(R11)
226              C       R11,SRTLRECL         CHECK POSSIBLE 0C4 - WE USE LM AND L
227    *                                      FOR SPEED, BUT FIELDS NEAR THE END
228    *                                      OF A RECORD REQUIRE SPECIAL TREATMENT
229    *                                      AT END OF BLK
230              BNH     *+14
231              MVC     6(2,R5),=Y(MVB2-LP5PB)
232              B       LP4E
233              STH     R7,6(R5)
234              B       LP4E
235    LP4DPD    LH      R11,8(R5)            OFFSET
236              LA      R11,8(R11)
237              C       R11,SRTLRECL         CHECK POSSIBLE 0C4 (AS ABOVE)
238              BNH     *+14
239              MVC     6(2,R5),=Y(MVPDL-LP5PB)
240              B       LP4E
241              STH     R8,6(R5)
242    *
243    LP4E      LA      R5,8(R5)
244              BCT     R10,LP4D
245    LP4F      STH     R9,6(R5)
246    *
247    *   BR ADDR. FOR FLD 1 IN FLD1D
248    *
249              CLI     FLDD+4,C'C'
250              BL      FLD1B
251              BH      FLD1PD
252              CLC     FLDD+2(2),=H'128'    CHECK CHAR FIELD LENGTH
253              BNL     FLD1VL
254              STH     R6,FLD1D
255              B       LP5P
```

APPENDIX A, KEY EXTRACTION FOR 2-D TOURNAMENT SORT
© COPYRIGHT 1993 AMDAHL CORPORATION

```
256  FLD1VL   CLC    FLDD+2(2),=H'254'    CHECK CHAR FIELD LENGTH
257           BNL    FLD1VL2
258           MVC    FLD1D(2),=Y(MVVLC-LP5PB)
259           B      LP5P
260  FLD1VL2  MVC    FLD1D(2),=Y(MVVLC2-LP5PB)
261           B      LP5P
262  FLD1B    LH     R11,FLDD           OFFSET
263           LA     R11,4(R11)
264           C      R11,SRTLRECL       CHECK POSSIBLE 0C4
265           BNH    *+14
266           MVC    FLD1D(2),=Y(MVB2-LP5PB)
267           B      LP5P
268           STH    R7,FLD1D
269           B      LP5P
270  FLD1PD   LH     R11,FLDD           OFFSET
271           LA     R11,8(R11)
272           C      R11,SRTLRECL       CHECK POSSIBLE 0C4
273           BNH    *+14
274           MVC    FLD1D(2),=Y(MVPDL-LP5PB)
275           B      LP5P
276           STH    R8,FLD1D
277  *
278           EJECT
279  LP5P     EQU    *
280           L      R5,SRTKEYLN                                        @01
281           LA     R5,6(R5)           KEYLENGTH+2+4                   @00
282           ST     R5,SRTKEYLN                                        @01
283  *
284  *----------------------------------------------------------------*
285  *. FOR EA REC IN REC BLOCK MOVE SORTKEY(S)+REC ADDR TO SRTKPTR AREA @01
286  *----------------------------------------------------------------*
287           L      R1,SRT1STBK
288           L      R11,SRTKPTR
289           LH     R10,LKPCNT-LKPAGE(R1) NO.OF RECS IN BLK 1           @01
290           LA     R5,FLDD
291  *
292           LH     R6,FLDD            OFFSET FIELD 1
293           LA     R1,LKPAGESZ(R1)    1ST RECORD    (THIS LINE ADDED)  @01
294           ALR    R6,R1
295           LH     R8,FLDD+2
296           LH     R7,FLD1D           BR AD FOR FLD 1
297  *
298           L      R2,XCAD            MAINTAIN XC REGS
299           L      R4,XCLEN
300           LR     R9,R11
```

APPENDIX A, KEY EXTRACTION FOR 2-D TOURNAMENT SORT
© COPYRIGHT 1993 AMDAHL CORPORATION

```
301              AL     R9,XCST           FIRST ASC FIELD WITHIN KEY
302   *@01       L      R10,KEYLEN
303   *@01       LA     R10,4(R10)
304   *@01       ST     R10,KEYLEN        KEYLENGTH + PTR TO RECORD
305   *@01       L      R10,4(R1)         NO. RECS. IN BLK 1
306   *
307              B      LP5PB(R7)         PROCESS FIRST RECORD
308   *
309   LP5PB      EQU    *
310   *
311   *    CHAR. FIELDS WITH 1 BYTE LENGTH CODE
312   *
313              EX     R8,EXMVC          MVC 0(0,R11),1(R6)
314   *
315              IC     R14,0(R6)
316              STC    R14,1(R8,R11)         LENGTH BYTE FOLLOWS FIELD
317   *
318              LH     R7,6(R5)
319              LA     R11,2(R8,R11)
320              LH     R6,8(R5)          OFFSETS & LENGTHS
321              ALR    R6,R1             FOR NEXT FIELD WITHIN REC
322              LH     R8,10(R5)
323              C      R7,=A(LP6PB)
324              LA     R5,8(R5)
325              BNE    LP5PB(R7)         NEXT FIELD BR ADDR
326   *
327   *    XC WITH XSTR AND CHECK FOR END OF BLK
328   *
329   LP6PB      EX     R4,EXXC3          BIT INVERSION FOR ASC FIELDS
330   *
331              LH     R7,FLD1D          BR OFFSET FOR FLD 1
332   *
333              L      R5,RECCNT                  INSURE PRIMARY KEY ORDER @00
334              BCTR   R5,0                                                @00
335              STH    R5,0(R11)                                           @00
336              ST     R5,RECCNT                                           @00
337   *
338              ST     R1,2(R11)         RECPTR FOLLOWS KEY                @00
339              LA     R5,FLDD
340              AL     R1,SRTLRECL       NEXT REC
341              LA     R11,6(R11)        KEY PTR                           @00
342              AL     R9,SRTKEYLN       XC ADDR
343              BCT    R10,LP5PB(R7)     PROCESS FLD 1
344   *
345   *                                   END OF BLOCK
```

APPENDIX A, KEY EXTRACTION FOR 2-D TOURNAMENT SORT
© COPYRIGHT 1993 AMDAHL CORPORATION

```
346  *..  AT END OF BLOCK, INIT NEXT BLOCK AND LOOP AGAIN              @01
347  NEWBLK    L      R1,BLKPTR              CURRENT BLK
348  *@01      L      R1,0(R1)               NEXT BLK
349            L      R1,LKPNEXT-LKPAGE(R1)  NEXT CHAINED PAGE         @01
350            LTR    R1,R1
351            BZ     EXTRACTN
352            ST     R1,BLKPTR
353  *@01      L      R10,4(R1)              NO. RECS IN BLOCK
354            LH     R10,LKPCNT-LKPAGE(R1)  NO.OF RECS IN BLK 1       @01
355            LA     R1,LKPAGESZ(R1)        FIRST REC                 @01
356  *@01      LA     R1,8(R1)               FIRST REC
357            LH     R6,FLDD                OFFSET OF FLD 1
358            ALR    R6,R1
359            B      LP5PB(R7)              EXTRACT FIELD 1
360  *
361  *    XC FOR KEYS REQUIRING XC OF  > 255 BYTES
362  *
363  LP6P2     XC     0(255,R9),0(R2)
364            LR     R14,R9
365            LR     R15,R2
366            LA     R9,255(R9)
367            LA     R2,255(R2)
368            EX     R4,EXXC3               BIT INVERSION FOR ASC FIELDS
369            LR     R9,R14
370            LR     R2,R15
371  *
372  LP6P3     LH     R7,FLD1D               BR OFFSET FOR FLD 1
373  *
374            L      R5,RECCNT                     INSURE PRIMARY KEY ORDER @00
375            BCTR   R5,0                                                   @00
376            STH    R5,0(R11)                                              @00
377            ST     R5,RECCNT                                              @00
378  *
379            ST     R1,2(R11)              RECPTR FOLLOWS KEY             @00
380            LA     R5,FLDD
381            AL     R1,SRTLRECL            LL, OFFSET AND BR ADDR FOR
382            LA     R11,6(R11)                FLD 1                       @00
383            AL     R9,SRTKEYLN
384            BCT    R10,LP5PB(R7)
385            B      NEWBLK
386  *
387  *    BINARY DATA
388  *
389  MVB2      LH     R14,1(R6)              DATA NEAR END OF REC
390            SLL    R14,16
```

APPENDIX A, KEY EXTRACTION FOR 2-D TOURNAMENT SORT
© COPYRIGHT 1993 AMDAHL CORPORATION

```
391                B       MVB+4
392     MVB        L       R14,1(R6)
393     *
394                CLI     0(R6),0
395                BE      *+8                     NULL FIELD
396     *
397                X       R14,=X'80000000'        INVERT SIGN BIT FOR CL
398                ST      R14,0(R11)
399     *
400                IC      R14,0(R6)               LENGTH BYTE FOLLOWS KEY
401                STC     R14,1(R8,R11)
402     *
403                LH      R7,6(R5)
404                LA      R11,2(R8,R11)
405                LH      R6,8(R5)        FIELD OFFSETS & LENGTHS
406                ALR     R6,R1
407                LH      R8,10(R5)
408                LA      R5,8(R5)
409                B       LP5PB(R7)               NEXT FIELD
410     *
411     *
412     *   PD DATA    -   MVPDL RARELY EXECUTED
413     *
414     MVPDL      C       R10,=F'1'               LAST RECORD WITHIN BLK
415                LA      R7,1(R8,R6)             SIGN NIBBLE
416                BH      MVPD+4
417                EX      R8,EXMVC
418                LM      R14,R15,0(R11)
419                B       MVPD+8
420     *
421     *
422     MVPD       LA      R7,1(R6,R8)             SIGN
423                LM      R14,R15,1(R6)
424                SRDL    R14,4                   DELETE SIGN NIBBLE
425                TM      0(R7),X'01'             OPTIMIZE FOR POSITIVE
426                BO      PDNEG
427     *
428                CLI     0(R6),0
429                BE      PDPOS+4                 NULL FIELD < NEG.
430     *
431     PDPOS      X       R14,=X'80000000'        INSURE CORRECT SORT ORDER
432                STM     R14,R15,0(R11)
433     *
434                LH      R15,6(R5)
435                LA      R11,1(R8,R11)
```

APPENDIX A, KEY EXTRACTION FOR 2-D TOURNAMENT SORT
© COPYRIGHT 1993 AMDAHL CORPORATION

```
436             LH      R6,8(R5)            FIELD OFFSETS & LENGTHS
437             ALR     R6,R1
438             LH      R8,10(R5)
439             LA      R5,8(R5)            PTR TO NEXT FLDD ENTRY
440             B       LP5PB(R15)          NEXT FIELD
441     *
442     PDNEG   TM      0(R7),X'0F'         SIGN NIBBLE
443             BO      PDPOS
444             X       R14,=X'7FFFFFFF'
445             X       R15,=X'FFFFFFFF'
446             B       PDPOS+4
447             EJECT
448     *
449     *   CH FIELDS W/ 2 BYTE EL LENGTH CODE
450     *
451     MVVLC   BCTR    R8,0
452             XR      R14,R14
453             TM      0(R6),X'80'         1 BYTE LENGTH CODE
454             BO      MV128
455             EX      R8,EXMVC
456             IC      R14,0(R6)           LENGTH CODE
457             STH     R14,1(R11,R8)
458     *
459     VL1     LH      R7,6(R5)
460             LA      R11,3(R11,R8)
461             LH      R6,8(R5)            FIELD OFFSETS & LENGTHS
462             ALR     R6,R1
463             LH      R8,10(R5)
464             LA      R5,8(R5)
465             B       LP5PB(R7)           NEXT FIELD
466     *
467     MV128   EX      R8,EXMVC2
468             LH      R14,0(R6)
469             STH     R14,1(R11,R8)
470             B       VL1
471     *
472     *   CH DATA WITH MAX. LL > 255
473     *       ENTIRE FIELD IS MOVED TO CLEAR STORAGE KEY AREA
474     *
475     MVVLC2  BCTR    R8,0
476             ICM     R0,B'0011',0(R6)
477             LA      R6,1(R6)
478             LR      R14,R11
479             LA      R15,1(R8)
480             LR      R7,R15
```

APPENDIX A, KEY EXTRACTION FOR 2-D TOURNAMENT SORT
© COPYRIGHT 1993 AMDAHL CORPORATION

```
481            BNM     MV256           DATA FOLLOWS 1 BYTE LENGTH CODE
482            LA      R6,1(R6)
483      *
484    MV256   MVCL    R14,R6
485            STH     R0,1(R8,R11)
486      *
487            LH      R7,6(R5)
488            LA      R11,3(R11,R8)
489            LH      R6,8(R5)        FIELD OFFSETS & LENGTHS
490            ALR     R6,R1
491            LH      R8,10(R5)
492            LA      R5,8(R5)
493            B       LP5PB(R7)       NEXT FIELD
494      *
495    EXTRACTN EQU    *
496      *
497      *. RETURN TO TSRTEXT CALLER                                @01
498            LA      R15,0                                        @01
499            $RETURN (R15)                                        @01
500      *
501    EXPK    PACK    PK8,0(0,R7)
502    EXXC    XC      0(0,R11),0(R11)
503    EXXC2   XC      0(0,R14),0(R14)
504    EXXC3   XC      0(0,R9),0(R2)
505    EXMVC   MVC     0(0,R11),1(R6)
506    EXMVC2  MVC     0(0,R11),2(R6)
507      *
508    TRTBL   DC      256X'0'
509            ORG     TRTBL+X'6B'
510            DC      X'FF'
511            ORG     TRTBL+256
512            SPACE 3
513            LTORG
514    **********************************************************************
515      *
516      *   D U M M Y   S E C T I O N   D E F I N I T I O N S
517      *
518    **********************************************************************
519      *
520            PRINT ON
521            COPY    SAVETAM
522            ORG     ,                       FOR SAFETY.
523      *
524    BLKSZ   DS      F
525    BLKPTR  DS      A
```

APPENDIX A, KEY EXTRACTION FOR 2-D TOURNAMENT SORT
© COPYRIGHT 1993 AMDAHL CORPORATION

```
526   RECCNT    DS      F                                                    @00
527   FLDN      DS      F
528   XCAD      DS      F
529   XCST      DS      F
530   XCLEN     DS      F
531             DS      0D
532   PK8       DS      PL8
533   XSTR      DS      508X
534   FLD1D     DS      F
535   FLDD      DS      64H     (POS,LEN,TYP,ASC)  - 16 KEYS
536   *
537   STACKLEN  EQU     *-SAVEDYN           FOR $SAVE STACK CALC'N.           @01
538             EJECT
539             COPY    SRTBLK              TSORT OUTPUT BLOCK                @01
540             EJECT
541             COPY    TAMEQU              COPY LKPAGE                       @01
542             COPY    WALIST                                                @01
543             COPY    SMGBLWA                                               @01
544             COPY    TAMWK                                                 @01
545             END
546
```

APPENDIX B, 2-DIMENTIONAL TOURNAMENT SORT WITH OFFSET VALUE CODING
© COPYRIGHT 1993 AMDAHL CORPORATION

```
1    TSRTS     CSECT
2    TSRTS     AMODE   31
3    ************************************************************************
4    *                                                                      *
5    *    TSRTS - 2-DIMENSIONAL TOURNAMENT SORT WITH OFFSET VALUE CODING    *
6    *                                                                      *
7    ************************************************************************
8    ************************************************************************
9    ****                                                                ****
10   ****           THE INFORMATION CONTAINED HEREIN IS                  ****
11   ****         TRADE SECRET AND PROPRIETARY INFORMATION               ****
12   ****                           OF                                   ****
13   ****                     AMDAHL CORPORATION                         ****
14   ****                 AND IS NOT TO BE DISCLOSED                     ****
15   ****  WITHOUT THE EXPRESS WRITTEN CONSENT OF AMDAHL CORPORATION     ****
16   ****                                                                ****
17   ************************************************************************
18             SPACE
19   ************************************************************************
20   *                                                                      *
21   * INPUT   -  R1+0= ADDR OF SRTBLK DSECT                                *
22   *                  SRTKPTR  - STORAGE FOR (SORTKEYS+PTR)'S             *
23   *                  SRTTPTR  - LARGE SORT WORK AREA                     *
24   *                  SRTKEYLN - SUM OF ALL EL-KEYLENS+2+4                *
25   *                  SRTCNT   - TOTAL RECORD COUNT                       *
26   *                                                                      *
27   * OUTPUT -   SRTOUT AREA CONTAINS POINTERS TO SORTED RECORDS (EL-ROWS) *
28   *                                                                      *
29   * NOTES :                                                              *
30   *    TWO-DIMENSIONAL TOURNAMENT SORT WITH OFFSET VALUE CODING          *
31   *                                                                      *
32   *       STRUCTURE OF 8-BYTE CODEWORDS:                                 *
33   *           BYTE 0   -  FIRST BIT IS A COMPARISON INDICATOR (SEE BELOW)*
34   *                       7 BIT OFFSET REPRESENTING THE FULLWORD WITHIN  *
35   *                       THE KEY AT WHICH AN INEQUALITY WAS DETECTED    *
36   *           BYTES 1-5 - COPY OF FW AT THE INDICATED OFFSET             *
37   *                 6-8 - INDEX FOR CALCULATION OF PARENT NODES AND      *
38   *                       - KEY ADDRESSES                                *
39   *                                                                      *
40   *       LOSER TREE - THE LESSER COMPARAND IS STORED AT A NODE          *
41   *                    AND THE LARGER CODEWORD PLACED IN R0-R1           *
42   *                                                                      *
43   *       EQUAL CODEWORDS FORCE AN EXECUTION OF THE CFC-LOOP             *
44   *       (SIMILAR TO CFC INSTRUCTION), WITH THE LOSER'S                 *
45   *       CODEWORD UPDATED.                                              *
```

APPENDIX B, 2-DIMENTIONAL TOURNAMENT SORT WITH OFFSET VALUE CODING
© COPYRIGHT 1993 AMDAHL CORPORATION

```
46   *                                                                      *
47   *    TWO-DIMENSIONAL - THE TREE LAYOUT DIFFERS FROM THE CONVENTIONAL    *
48   *       BINARY TREE IN THAT SMALL 4-LEVEL SUBTREES ARE CHAINED          *
49   *       ALONG AN ANCESTOR PATH, IMPROVING LOCALITY OF REFERENCE         *
50   *       AND REDUCING INSTRUCTION PATH LENGTH.                           *
51   *                                                                      *
52   *    THIS MODULE SORTS "SMALL" FILES (<= 16K KEYS) WITH NO MERGE        *
53   *                                                                      *
54   ************************************************************************
55
```

APPENDIX B, 2-DIMENTIONAL TOURNAMENT SORT WITH OFFSET VALUE CODING
© COPYRIGHT 1993 AMDAHL CORPORATION

```
56   *
57           $SAVE  STACKLEN,ALIGN=DOUBLE    SAVE CALLER'S ENVIRONMENT    @01
58           USING  SAVETAM,R13              ... SAVE AREA STACK,         @01
59           USING  SRTBLK,R14               ... SORT CONTROL BLOCK       @01
60           B      START                                                 @01
61           SPACE  3                                                     @01
62           PGMID                                                        @01
63           EJECT                                                        @01
64   START   DS     0H                                                    @01
65           L      R14,0(R1)                                             @01
66           USING  SRTBLK,R14               ... SORT CONTROL BLOCK       @01
67           LA     R9,SRTOUT                START OF OUTPUT PTR LIST     @01
68           ST     R9,CUROPTR                                            @01
69           L      R9,SRTKPTR               KEY LIST PTR
70           AL     R9,SRTKEYLN
71           SL     R9,=F'4'
72           ST     R9,KPTR3                 REC PTR FOLLOWS KEY
73   *
74   *@01    L      R2,=A(140032)            16K DBLWORDS + CHAIN PTRS
75   *@01    GETMAIN RU,LV=(2),LOC=(ANY)
76           L      R1,SRTTPTR               PRE-ALLOC SORT WORK SPACE    @01
77   * ******************************************************************
78   *
79   *. COMPUTE LOG OF N MOD 4
80   *       WE COMPUTE THE LOG OF N MOD 4 TO DETERMINE THE NUMBER
81   * OF OCCUPIED LEVELS ON THE ROOT SUBTREE. ALL OTHER SUBTREES
82   * ARE FULLY UTILIZED.
83   *
84   *   STRUCTURE OF 128-BYTE SUBTREE:
85   *     FW 0 - PTR TO PARENT SUBTREE ROOT
86   *        1 - BYTE 0 RESERVED FOR DUMMY STORES AS CACHE PRE-FETCH
87   *            BYTES 1-3 ARE OFFSETS  OF THE THREE
88   *            ANCESTOR CODEWORDS ON THE PARENT SUBTREE
89   *             - THE FOURTH ANCESTOR IS THE ROOT
90   *     DW 1-15 - INDIVIDUAL NODES   - 1 IS ROOT
91   *
92   * ******************************************************************
93   *
94   LG1     LR      R0,R1
95           LA      R11,128
96           LNR     R11,R11
97   *                                       COMPUTE LOG(N)
98           L       R2,SRTCNT
99           SLL     R2,8
100          LA      R3,24
```

APPENDIX B, 2-DIMENTIONAL TOURNAMENT SORT WITH OFFSET VALUE CODING
© COPYRIGHT 1993 AMDAHL CORPORATION

```
101     LGLP    LTR     R2,R2
102             BM      LGCT
103             SLL     R2,1
104             BCT     R3,LGLP
105     LGCT    SLL     R2,1
106             LTR     R2,R2
107             BNZ     *+6
108             BCTR    R3,0            R3 = LOG N
109     *
110             LTR     R3,R3
111             BZ      NN1             1 REC SORT
112     *
113             LR      R4,R3
114             LR      R5,R3
115             SRL     R5,2            R5 = M = NUMBER OF DIM 1 LEVELS
116             N       R4,=X'00000003'
117             BNZ     *+10
118             LA      R4,4            R4 = H = LOG(N) MOD 4
119             BCTR    R5,0
120             LA      R7,1
121             SLL     R7,0(R4)        R7 = 2**(H+1)
122             LR      R1,R7              = NO. OF DESCENDENT
123             BCTR    R1,0                 SUBTREES OF ROOT
124     *                                    SUBTREE
125             ST      R4,H
126     *
127             LA      R15,4
128             SR      R15,R4
129             SLL     R15,3
130     *
131     *  BIT 0 = 1 = AUTOMATIC WINNER IN LOAD PHASE OF SORT
132     *        = 1 = AUTOMATIC LOSER IN SORT PHASE
133     *
134             LR      R9,R0
135             MVI     8(R9),X'80'
136             MVC     9(119,R9),8(R9) FILL WITH AUTOMATIC WINNERS
137     *
138             LR      R9,R7
139             SLL     R9,7            EACH SUBTREE IS 128 BYTES
140             LR      R10,R9          S1 = (R7) * 128
141             AR      R9,R0           OFFSET OF LEVEL 3 OF DIM 1
142             ST      R0,SM
143             LR      R4,R0
144             LR      R0,R9
145     *
```

APPENDIX B, 2-DIMENTIONAL TOURNAMENT SORT WITH OFFSET VALUE CODING
© COPYRIGHT 1993 AMDAHL CORPORATION

```
146     *                   FOLLOWING FILLS ALL SUBTREES OF EACH
147     *    LEVEL, FROM RIGHT TO LEFT, WITH AUTOMATIC WINNERS AND
148     *    CHAIN  POINTERS
149     *
150     *
151     S1LP    ST      R4,0(R9)
152             LR      R8,R7
153             AR      R8,R1
154             MVI     8(R9),X'80'
155             SRL     R8,1
156             MVC     9(119,R9),8(R9)        FILL WITH AUTOMATIC WINNERS
157             SLL     R8,3
158             LR      R6,R8
159             SRL     R6,4                   PARENTS WITHIN ROOT SUBTREE
160             SLL     R6,3+8
161             OR      R8,R6
162             SRL     R6,4+8
163             SLL     R6,8+8+3
164             OR      R8,R6
165             SLL     R8,0(R15)
166             ST      R8,4(R9)
167             AR      R9,R11
168             BCT     R7,S1LP
169     *
170             LTR     R5,R5
171             BZ      *+6
172             BCTR    R5,0                   R5 = M-1
173             ST      R5,M
174             LTR     R5,R5
175             BZ      TFILL
176     *
177     MLP     LR      R2,R10                 R10 = 2**(H+1) * 128
178             LR      R6,R2
179             SRL     R6,7
180             SLL     R2,4
181             LR      R10,R2                 R10 = S1 * 16
182             LA      R7,16
183             ST      R0,SM
184             LR      R1,R0                  R0 = T + S0
185             AR      R2,R1
186             LR      R0,R2                  R0 = (R0) + S1
187     *
188     SMLP    ST      R1,0(R2)
189             LR      R8,R7
190             LA      R8,15(R8)
```

APPENDIX B, 2-DIMENTIONAL TOURNAMENT SORT WITH OFFSET VALUE CODING
© COPYRIGHT 1993 AMDAHL CORPORATION

```
191             SRL     R8,1            OFFSET OF PARENT WITHIN SUBTREE IS
192             SLL     R8,3               FLOOR(X/2)*8
193             STC     R8,7(R2)
194             SRL     R8,4
195             SLL     R8,3
196             STC     R8,6(R2)
197             SRL     R8,4
198             SLL     R8,3
199             STC     R8,5(R2)
200             MVI     8(R2),X'80'
201             MVC     9(119,R2),8(R2)
202             AR      R2,R11                     -128
203             BCT     R7,SMLP
204             LA      R7,16
205             AR      R1,R11                     -128
206             BCT     R6,SMLP
207             BCT     R5,MLP
208     *
209     *   MACROS: NGEN  GENERATES CODE FOR LOAD PHASE
210     *           NTGEN   "        "    "  SORT   "
211     *           CGEN    "        "    "  CFC BRANCHES
212     *
213     *   USED TO UNROLL LOOPS FOR PERFORMANCE IN ITERATIVE
214     *   CODE.
215     *
216     *
217     TFILL   EQU     *
218             PRINT   GEN
219             MACRO
220             NGEN    &R,&R4,&N,&L,&LP
221     &RD     SETA    0
222             AIF     ('&R' NE 'R0').Z0
223     &RD     SETA    8
224     .Z0     ANOP
225     &NN     SETA    &N+1
226     &L&N    EQU     *
227             AIF     ('&LP' EQ '0').Z1
228             LA      R15,&RD.(&R4,&R)
229     .Z1     ANOP
230             L       R2,&RD.(&R4,&R)
231             AIF     ('&LP' EQ '0').Z2
232             LTR     R2,R2
233             BM      LPEND
234     .Z2     ANOP
235             CR      R0,R2
```

APPENDIX B, 2-DIMENTIONAL TOURNAMENT SORT WITH OFFSET VALUE CODING
© COPYRIGHT 1993 AMDAHL CORPORATION

```
236                 BH         &L&NN
237                 BE         CFC&L&N
238     C&L&N       L          R3,4+&RD.(&R4,&R)
239                 AIF        ('&R' EQ 'R0').Z3
240                 ST         R0,0(&R4,&R)
241                 ST         R1,4(&R4,&R)
242                 AGO        .Z4
243     .Z3         ANOP
244                 STM        R0,R1,8(&R4)
245     .Z4         ANOP
246                 LR         R0,R2
247                 LR         R1,R3
248                 MEND
249     *
250                 MACRO
251                 CGEN       &L,&N,&R4,&R,&LP
252     &N1         SETC       '&N'.'&LP'
253                 AIF        ('&L' NE 'NT').Z1
254                 AIF        ('&R' EQ 'R0').Z0
255     CFC&L&N1    LR         R15,&R4
256                 AR         R15,&R
257                 AGO        .Z5
258     .Z0         ANOP
259     CFC&L&N1    LA         R15,8(&R4)
260                 AGO        .Z5
261     .Z1         ANOP
262     CFC&L&N1    EQU        *
263     .Z5         ANOP
264     &M0         SETA       &N+1
265     &M1         SETC       '&M0'
266                 AIF        ('&LP' EQ '').Z2
267     &M          SETA       &LP+1
268     &M1         SETC       '&N'.'&M'
269     .Z2         ANOP
270                 CLM        R1,B'1000',4(R15)
271                 BH         &L&M1
272                 BL         C&L&N1
273                 LA         R3,&L&M1
274                 B          CFCLP
275                 MEND
276     *
277                 MACRO
278                 NGENA      &N,&LP
279     &R          SETA       4+&LP
280     &RZ         SETA       9-&LP
```

APPENDIX B, 2-DIMENTIONAL TOURNAMENT SORT WITH OFFSET VALUE CODING
© COPYRIGHT 1993 AMDAHL CORPORATION

```
281     &RW         SETA    3+&LP
282     &RD         SETA    0
283                 AIF     ('&LP' NE '4').Z0
284     &RD         SETA    8
285     &R          SETA    0
286     .Z0         ANOP
287     &RR         SETC    'R'.'&R'
288     &RWR        SETC    'R'.'&RW'
289     &LPP        SETA    &LP+1
290     NT&N&LP     EQU     *
291     .Z10        ANOP
292                 AIF     ('&N' NE '6').Z7
293                 C       R0,&RD.(R4,&RR)
294                 L       R2,&RD.(R4,&RR)
295                 AGO     .Z2
296     .Z7         ANOP
297                 C       R0,&RD.(R4,&RR)
298                 AIF     ('&LP' NE '1').Z1
299                 L       R10,0(R4)
300                 AGO     .Z2
301     .Z1         ANOP
302     &RDD        SETA    9-&LP
303                 IC      &RWR,&RZ.(R4)
304     .Z2         ANOP
305                 BH      NT&N&LPP
306                 BE      CFCNT&N&LP
307                 AIF     ('&N' NE '6').Z8
308     CNT&N&LP    L       R3,4+&RD.(R4,&RR)
309                 AGO     .Z9
310     .Z8         ANOP
311     CNT&N&LP    L       R2,&RD.(R4,&RR)
312                 L       R3,4+&RD.(R4,&RR)
313     .Z9         AIF     ('&LP' EQ '4').Z3
314                 ST      R0,0(R4,&RR)
315                 ST      R1,4(R4,&RR)
316                 AGO     .Z4
317     .Z3         ANOP
318                 STM     R0,R1,8(R4)
319     .Z4         ANOP
320                 LR      R0,R2
321                 LR      R1,R3
322                 MEND
323     *
324                 L       R10,SM           PTR TO LAST SUBTREE LVL M-1
325                 LA      R10,128(R10)     ROOT OF 1ST LEAF SUBTREE
```

APPENDIX B, 2-DIMENTIONAL TOURNAMENT SORT WITH OFFSET VALUE CODING
© COPYRIGHT 1993 AMDAHL CORPORATION

```
326   *
327         L      R4,H
328         LA     R5,4
329         SR     R5,R4                R4 = H
330         LR     R6,R5
331         M      R4,=A(HROF)          BRANCH OFFSET FOR ROOT
332         ST     R5,HR
333         LR     R5,R6
334         L      R8,M
335         M      R4,=A(HTOF)          BRANCH OFFSET FOR ROOT
336   *                          ---NUMBER OF ROOT SUBTREE LEVELS
337   *                          IS VARIABLE, REQUIRING A BRANCH INTO
338   *                          THE APPROPRIATE GENERATED CODE
339   *
340   *
341         ST     R5,HT
342         SLL    R8,2
343         L      R8,NTADR(R8)
344         ST     R8,NTBR
345   *
346   *     LOAD PHASE - CODEWORDS ARE FORMED FROM KEYS SEQUENTIALLY
347   *     PROCESSED, AND THE LOSER OF THE PAIR STORED AT THE LEAF
348   *     NODE. WINNER PROGRESSES UP THE PATH UNTIL ENCOUNTERING
349   *     AN AUTOMATIC WINNER (BIT 0 =1)
350   *
351         XR     R5,R5                USED FOR 1-BYTE SUBTREE OFFSETS
352         XR     R6,R6
353         XR     R7,R7
354   *
355         L      R8,SRTCNT
356         ST     R8,NNLM
357         S      R8,=F'2'
358         ST     R8,NLIM
359   *
360         L      R9,SRTKEYLN
361         SLL    R9,1
362         ST     R9,KEYLEN2           2 KEYS PER LOAD ITERATION
363   *
364         LA     R15,OTBL             TABLE OF OFFSETS
365         ST     R15,OTOF
366   *
367         L      R9,SRTKPTR
368         LA     R11,0
369   *     MVI    128+4(R10),X'00'     DISABLE PRE-FETCH FOR 5995A
370         LA     R3,1(R11)
```

APPENDIX B, 2-DIMENTIONAL TOURNAMENT SORT WITH OFFSET VALUE CODING
© COPYRIGHT 1993 AMDAHL CORPORATION

```
371              L       R8,SRTKEYLN
372       *
373       03790000
374              C       R11,NLIM           2 REC SORT                            @02
375       03800000
376              BE      FILLN                                                    @02
377       03810000
378              B       FILLP
379       *
380       LPEND  L       R8,SRTKEYLN
381              STM     R0,R1,0(R15)       CODEWORD REACHES THIS POINT FROM
382       *                                 COMPARISON WITH AUTOMATIC WINNER
383              L       R15,OTOF
384              LA      R11,2(R11)
385              A       R9,KEYLEN2
386              C       R11,NLIM           LAST RECORD BEGINS SORT
387              LA      R15,4(R15)
388              ST      R15,OTOF
389              BNL     FILLN
390              C       R15,=A(OTBL+32)    RE-CYCLE OFFSET FOR NEW SUBTREE
391              LA      R3,1(R11)
392              BE      STEND
393       *
394       FILLP  IC      R5,3(R15)
395              IC      R6,2(R15)
396              IC      R7,1(R15)
397       *
398              L       R2,0(R8,R9)        FORM CODEWORD FROM FIRST FW OF
399              SLL     R3,8                 KEY; R3 = INDEX
400              SRDL    R2,8
401       *
402              ST      R2,0(R10,R5)       TENTATIVE STORE
403              ST      R3,4(R10,R5)
404       *
405              LA      R15,0(R10,R5)
406       *
407              L       R0,0(R9)           FIRST FW OF REC
408              LR      R1,R11             J
409              SLL     R1,8
410              SRDL    R0,8               CODEWORD OF ADJACENT KEY
411       *
412       N1     CR      R0,R2              LEAF NODE COMPARISON
413              BH      N2
414              BE      CFCN1
415       CN1    ST      R0,0(R10,R5)
```

APPENDIX B, 2-DIMENTIONAL TOURNAMENT SORT WITH OFFSET VALUE CODING
© COPYRIGHT 1993 AMDAHL CORPORATION

```
416            ST      R1,4(R10,R5)
417            LR      R0,R2
418            LR      R1,R3
419    *
420            NGEN    R6,R10,2,N         LEVELS 2-4 OF LEAF SUBTREE
421            NGEN    R7,R10,3,N
422            NGEN    R0,R10,4,N
423    *
424    N5      L       R4,0(R10)
425            IC      R5,7(R10)
426            IC      R6,6(R10)
427            IC      R7,5(R10)
428            L       R8,M               R8 = NO. SUBTREE LEVELS -1
429            LTR     R8,R8
430            BZ      NMR
431    *
432    N5LP    EQU     *
433    *
434            NGEN    R5,R4,1,NM,2       SECOND LEVEL SUBTREE COMPARISONS
435    HROF    EQU     *-NM1
436            NGEN    R6,R4,2,NM,2
437            NGEN    R7,R4,3,NM,2
438            NGEN    R0,R4,4,NM,2
439    *
440    NM5     IC      R5,7(R4)           OFFSETS OF ANCESTOR NODES
441            IC      R6,6(R4)
442            IC      R7,5(R4)
443            L       R4,0(R4)           ROOT OF PARENT SUBTREE
444            BCT     R8,N5LP
445    *
446    NMR     L       R15,HR             PROCESS ROOT
447            B       N5LP(R15)
448    *
449    STEND   LA      R15,OTBL
450            ST      R15,OTOF
451            L       R8,SRTKEYLN
452            LA      R10,128(R10)       NEXT SUBTREE ROOT
453    *       MVI     128+4(R10),X'00'   PRE-FETCH
454            B       FILLP
455    *
456    *       EACH NODE BRANCHES TO SEPARATE TRIAL COMPARISONS OF
457    *    THE FOURTH BYTE (BYTE 0 OF FW 1 OF CODEWORD); IF EQUAL
458    *    THE MORE EXPENSIVE CFCLP WILL BE EXECUTED
459    *
460    *
```

APPENDIX B, 2-DIMENTIONAL TOURNAMENT SORT WITH OFFSET VALUE CODING
© COPYRIGHT 1993 AMDAHL CORPORATION

```
461             CGEN    N,1,R10,R5          EQUAL COMPARE CHECKS FOR LOAD
462             CGEN    N,2,R10,R6              PHASE
463             CGEN    N,3,R10,R7
464             CGEN    N,4,R10,R0
465             CGEN    NM,1,R4,R5
466             CGEN    NM,2,R4,R6
467             CGEN    NM,3,R4,R7
468             CGEN    NM,4,R4,R0
469     *
470             CGEN    NT,3,R4,R5,1        EQUAL COMPARE CHECKS FOR SORT PHASE
471             CGEN    NT,3,R4,R6,2
472             CGEN    NT,3,R4,R7,3
473             CGEN    NT,3,R4,R0,4
474     *
475             CGEN    NT,4,R4,R5,1
476             CGEN    NT,4,R4,R6,2
477             CGEN    NT,4,R4,R7,3
478             CGEN    NT,4,R4,R0,4
479     *
480             CGEN    NT,5,R4,R5,1
481             CGEN    NT,5,R4,R6,2
482             CGEN    NT,5,R4,R7,3
483             CGEN    NT,5,R4,R0,4
484     *
485             CGEN    NT,6,R4,R5,1
486             CGEN    NT,6,R4,R6,2
487             CGEN    NT,6,R4,R7,3
488             CGEN    NT,6,R4,R0,4
489     *
490     *   EXTRACT THE INDEX AND CALCULATE KEY ADDRESS
491     *   FROM BOTH CODEWORDS. NOTE THAT APPENDING RECORD
492     *   POINTERS ASSURES UNIQUE ORDER
493     *   R3 CONTAINS THE ADDRESS OF THE NEXT CODEWORD TREE
494     *   NODE COMPARISON
495     *   LOSER'S CODEWORD IS UPDATED
496     *
497     CFCLP   STM     R4,R7,SAVE4
498             LR      R4,R1
499             N       R4,X00F
500             IC      R5,0(R15)
501             MH      R4,SRTKEYLN+2
502             ICM     R7,B'0111',5(R15)
503             AL      R4,SRTKPTR
504             MH      R7,SRTKEYLN+2
505             AL      R7,SRTKPTR
```

APPENDIX B, 2-DIMENTIONAL TOURNAMENT SORT WITH OFFSET VALUE CODING
© COPYRIGHT 1993 AMDAHL CORPORATION

```
506              SLL     R5,2
507              LR      R2,R1
508      *
509      CFCLP2  L       R6,4(R5,R4)
510              CL      R6,4(R5,R7)
511              LA      R5,4(R5)
512              BL      CFCL
513              BH      CFCH
514              L       R6,4(R5,R4)
515              CL      R6,4(R5,R7)
516              LA      R5,4(R5)
517              BL      CFCL
518              BH      CFCH
519              B       CFCLP2
520      *
521      CFCL    LM      R0,R1,0(R15)
522              ST      R2,4(R15)
523              SRL     R5,2
524              STC     R5,0(R15)
525              ST      R6,1(R15)
526              LM      R4,R7,SAVE4
527              BR      R3
528      *
529      CFCH    L       R6,0(R5,R7)
530              SRL     R5,2
531              STC     R5,0(R15)
532              ST      R6,1(R15)
533              LM      R4,R7,SAVE4
534              BR      R3
535              EJECT
536      *
537      *       ONE RECORD SORT
538      *
539      *
540      NN1     L       R15,CUROPTR
541              L       R1,SRTKPTR
542              AL      R1,SRTKEYLN
543              S       R1,=F'4'
544              L       R1,0(R1)
545              ST      R1,0(R15)
546              B       RETN
547      *
548      *       LAST RECORD LOADED COMMENCES SORT PHASE.
549      * AS WINNERS EMERGE AT STAGE K, THE VALUE (-(N-K)) IS
550      * PLACED IN R0 AS AN AUTOMATIC LOSER TO ASSURE
```

APPENDIX B, 2-DIMENTIONAL TOURNAMENT SORT WITH OFFSET VALUE CODING
© COPYRIGHT 1993 AMDAHL CORPORATION

```
551    *   THE MINIMUM NUMBER OF STORES (I.E. -(N-1) > -(N-K) WITH CL)
552    *   PARENT OF THE PREVIOUS WINNER IS COMPUTED FOR THE
553    *   FIRST COMPARISON, AND THE TREE TRAVERSED BY ANCESTOR
554    *   CHAIN. POINTERS ARE LOADED IN ADVANCE OF USAGE
555    *   TO AVOID INTERLOCKS.
556    *
557    *
558    FILLN   LR      R4,R10
559            C       R15,=A(OTBL+32)     NEW SUBTREE ?
560            LA      R3,1(R11)
561            BL      *+12
562            LA      R15,OTBL
563            LA      R4,128(R4)
564    *
565            LA      R10,128(R4)
566    *
567            IC      R5,3(R15)           LEAF NODE OFFSETS
568            IC      R6,2(R15)
569            IC      R7,1(R15)
570    *
571            C       R3,NNLM
572            BNL     NFILL
573            L       R2,0(R8,R9)
574            SLL     R3,8
575            SRDL    R2,8
576            ST      R2,0(R4,R5)
577            ST      R3,4(R4,R5)
578    *
579    NFILL   L       R0,0(R9)            FORM INITIAL CODEWORD FOR KEY N
580            LR      R1,R11
581            SLL     R1,8
582            SRDL    R0,8
583    *
584            L       R3,NTBR             BRANCH ADDR. INTO UNROLLED CODE
585    *                                   FOR THIS VALUE OF N
586            L       R8,SRTCNT
587            L       R11,HT
588    *
589            L       R15,SM
590            LA      R15,128(R15)
591            ST      R15,SM              OFFSET OF LEAF SUBTREE
592    *
593            L       R9,=X'00FFFFF0'
594    *
595            BR      R3
```

APPENDIX B, 2-DIMENTIONAL TOURNAMENT SORT WITH OFFSET VALUE CODING
© COPYRIGHT 1993 AMDAHL CORPORATION

```
596     *
597     *  MAXIMUM TREE SIZE IS 2**14, WARRANTING FOUR LEVELS
598     *  SUBTREES WITH FOUR COMPARISON NODES EACH
599     *
600     *
601             NGENA     3,1
602             NGENA     3,2
603             NGENA     3,3
604             NGENA     3,4
605     *
606     NT35    LR        R4,R10
607     *
608             NGENA     4,1
609             NGENA     4,2
610             NGENA     4,3
611             NGENA     4,4
612     *
613     NT45    LR        R4,R10
614     *
615             NGENA     5,1
616             NGENA     5,2
617             NGENA     5,3
618             NGENA     5,4
619     *
620     NT55    LR        R4,R10
621     *
622             B         NT61+0(R11)          BRANCH INTO ROOT SUBTREE
623             NGENA     6,1
624     HTOF    EQU       *-NT61
625             NGENA     6,2
626             NGENA     6,3
627             NGENA     6,4
628     *
629     NT65    EQU       *
630     *
631     *   R0-R1 CONTAINS THE NEXT ITEM IN SORT ORDER
632     *   QUICKLY COMPUTE THE ADDRESS OF THE PARENT SUBTREE ROOT
633     *
634             LR        R4,R1
635             NR        R4,R9
636             SLL       R4,3
637             AL        R4,SM
638     *       MVI       4(R4),X'00'
639     *
640             L         R15,CUROPTR          CURRENT PTR IN OUTPUT LIST
```

APPENDIX B, 2-DIMENTIONAL TOURNAMENT SORT WITH OFFSET VALUE CODING
© COPYRIGHT 1993 AMDAHL CORPORATION

```
641              L        R3,NTBR
642              LR       R2,R1
643              N        R2,X00E
644              SLL      R2,1
645      *
646              N        R1,X00F            INDEX
647              MH       R1,SRTKEYLN+2      * KEYLENTH
648              AL       R1,KPTR3           KPTR+KEYLEN
649      *
650              L        R1,0(R1)           RECORD ADDRESS
651      *
652              ST       R1,0(R15)
653              LA       R15,4(R15)
654              ST       R15,CUROPTR
655      *
656              LNR      R0,R8              LOAD (-N)
657              XR       R1,R1
658      *
659              IC       R5,OTBL+3(R2)      OFFSETS WITHIN LEAF
660              IC       R6,OTBL+2(R2)
661              IC       R7,OTBL+1(R2)
662      *
663              BCTR     R8,R3
664      *
665      *       ABEND    99,DUMP
666      *
667      RETN    EQU      *
668              LA       R15,0                                          @01
669              $RETURN  (R15)                                          @01
670      *
671      LENCS   EQU      (*-TSRTS+128)/128
672              ORG      TSRTS+LENCS*128
673      *
674      *
675      *
676      X00F    DC       X'00FFFFFF'
677      X00E    DC       X'0000000E'
678      OTBL    DC       X'00102040,00102048,00102850,00102858'
679              DC       X'00183060,00183068,00183870,00183878'
680      NTADR   DC       A(NT51),A(NT41),A(NT31)
681      *
682              SPACE 3
683              LTORG
684      ****************************************************************
685      *
```

APPENDIX B, 2-DIMENTIONAL TOURNAMENT SORT WITH OFFSET VALUE CODING
© COPYRIGHT 1993 AMDAHL CORPORATION

```
686    *     D U M M Y     S E C T I O N     D E F I N I T I O N S
687    *
688    ***********************************************************************
689    *
690              PRINT   ON
691              COPY    SAVETAM                                                @01
692              ORG     ,                    FOR SAFETY.                       @01
693    KPTR3    DS      A
694    CUROPTR  DS      F
695    SM       DS      F
696    M        DS      F
697    H        DS      F
698    HR       DS      F
699    HT       DS      F
700    NTBR     DS      F
701    KEYLEN2  DS      F
702    NLIM     DS      F
703    NNLM     DS      F
704    LN       DS      F
705    OTOF     DS      F
706    SAVE2    DS      2F
707    SAVE4    DS      6F
708    *
709    STACKLEN EQU     *-SAVEDYN            FOR $SAVE STACK CALC'N.            @01
710             EJECT
711             COPY    SRTBLK               TSORT OUTPUT BLOCK                 @01
712             EJECT
713             COPY    TAMEQU               REGS EQUATES                       @01
714             COPY    WALIST                                                  @01
715             COPY    SMGBLWA                                                 @01
716             END     TSRTS
717
```

I claim:

1. A computer system, comprising:

storage means for storing a list of records $R_1, \ldots, R_N$ to be sorted where each record is associated with a corresponding one of the keys $K_1, \ldots, K_N$, respectively, for ordering the records, processing means for processing said records and keys and for controlling said storage means, said processing means including, means for forming a two-dimensional tree having a tree structure in said storage means where said tree structure is formed of nodes including a single root node and a plurality of leaf nodes where each node except the root node is a child of exactly one parent node and wherein, said nodes form a logical tree having a binary tree structure where each node is a parent node of at most two child nodes, said two-dimensional tree is organized into a tree structure of a plurality of subtrees, where each subtree is formed by a plurality of said nodes organized in a binary tree structure, and where for each particular node in a particular subtree that is the root node in the particular subtree, then said particular node has a parent node that is a leaf node in another subtree whereby said another subtree is the parent subtree of the particular subtree, code means for storing codes representing keys into said nodes, sort means for performing a tree sort of said keys using said codes by accessing subtrees.

2. The computer system of claim 1 wherein said storage means has a plurality of hierarchical storage levels.

3. The computer system of claim 1 wherein said sorting means includes means for initializing said two-dimensional tree with initial offset codes, executing a two-dimensional tournament sort using offset-value coding.

4. A computer system, comprising:

storage means for storing a list of records $R_1, \ldots, R_N$ to be sorted where each record associated with one or more keys $K_1, \ldots, K_N$ for ordering the records, processing means for processing said records and keys and for controlling said storage means, said processing means having, means for forming a two-dimensional tree of (N−1) values in said storage means, said two-dimensional tree formed by a plurality of subtrees defining a first dimension where each subtree is formed by a plurality of binary nodes defining a second dimension, means for forming initial offset codes associated with said keys, means for initializing said two-dimensional tree with said initial offset codes, means for performing a tournament sort of said records by sorting said keys through accessing offset codes in said tree using a tree index using said first and second dimensions.

* * * * *